(12) United States Patent
MacDonald et al.

(10) Patent No.: US 6,195,159 B1
(45) Date of Patent: Feb. 27, 2001

(54) LENS TESTING SYSTEM

(75) Inventors: Robert E. MacDonald, Dracut; Danielle M. Berven, Lincoln, both of MA (US)

(73) Assignee: AGFA Corporation, Wilmington, MA (US)

( * ) Notice: Subject to any disclaimer, the term of this patent is extended or adjusted under 35 U.S.C. 154(b) by 0 days.

(21) Appl. No.: 09/223,641

(22) Filed: Dec. 30, 1998

(51) Int. Cl.$^7$ ........................................................ G01J 1/00
(52) U.S. Cl. ................................................................ 356/123
(58) Field of Search ................................. 356/123, 124.5, 356/125, 124; 359/206, 662; 250/559.07

(56) References Cited

U.S. PATENT DOCUMENTS

| | | | |
|---|---|---|---|
| 3,743,427 | * 7/1973 | Weiser | 356/124 |
| 5,661,816 | * 8/1997 | Fantone et al. | 382/100 |

* cited by examiner

Primary Examiner—Frank G. Font
Assistant Examiner—Tu T. Nguyen
(74) Attorney, Agent, or Firm—Edward L. Kelley; Paul Pysher

(57) ABSTRACT

A system which determines one or more properties of a lens includes a light source and a target pattern illuminated by the light source illuminates and substantially positioned at a first conjugate position of the lens. A detector, including an active surface, is positioned at a second conjugate position of the lens such that an image of the target pattern is formed on the active surface. The detector generates an analog electrical signal based on the image and the a generator converts the electrical signal to a representative digital signal for processing. In the system, the detector is movable relative to the lens to test the lens at plural focus positions, and plural detector output signals correspond to a feature of the target pattern at plural focus positions. A memory stores computer-executable process steps, and a processor executes the process steps stored in the memory so as to obtain a modulation transfer function value of the lens based on a position of the detector with respect to the lens, a rotational orientation of the lens about its optical axis, a color of the light and the lens distortion measured at a plurality of field positions.

47 Claims, 17 Drawing Sheets

FIXTURE PARAMETERS

129

NUMBER FFT POINTS: 128 — 130

PIXEL SPACING: 7 MICRONS

NUMBER FOCUS POSITIONS: 2 — 132

FOCUS INCREMENT: 0.1 mm — 134

MTF LOCATION: 35 lp/mm

NUMBER BITS/PIXELS: 8 — 137

DERIVATIVE THRESHOLD: 5 %

139

NUMBER OF ORIENTATIONS: 1 — 140

NUMBER FIELD POSITIONS: 5 — 141

FIELD POS. 1: 0 — 142

FIELD POS. 2: 1 — 143

FIELD POS. 3: 3 — 145

FIELD POS. 4: 6 — 146

FIELD POS. 5: 7 — 147

RESOLUTION: 840 — 149

DETECT FOOTPRINT — 150

151 — 0.9001 RED
152 — 0.8673 GREEN
154 — 0.7745 BLUE

MFT FOR FOCUS DEPTH: 0.4 — 156

MINIMUM FOCUS DEPTH: 0.12 — 157

MAXIMUM DISTORTION: 0.001 — 158

MAXIMUM COLOR ERROR: 0.001 — 159

ACTUATOR SPEED: 20 mm/s — 160

ACTUATOR ACCEL.: 1 mm/s^2 — 161

TILT CORRECTION: 0 — 162

SAMPLING 0.9

OK    CANCEL    WRITE FILE

FIG. 4

LENS TEST SUMMARY

LENS SERIAL NUMBER: 47　　　　RESOLUTION: 2600

RESULTS

| | VALUE | SPEC | | | STATUS |
|---|---|---|---|---|---|
| DEPTH OF FOCUS: | 0.114398380 | 0.2 MIN. | | | FAIL |
| FOCAL LENGTH: | 62.27624836 | 62 MIN. | 62.6 MAX. | | PASS |
| DISTORTION: | 0.829623300 | 0.5 MAX. | | | PASS |
| LATERAL COLOR: | -1.34749999 | 0.5 MAX. | | | PASS |

DONE　　　NEXT LENS

FIG. 14

LENS TESTING SYSTEM

BACKGROUND OF THE INVENTION

1. Field of the Invention

The present invention relates generally to a system for testing properties of a lens, and more specifically to a system for testing lenses that are used in scanners or the like. In particular, the system determines a lens' through-focus modulation transfer function, distortion, focal length, and color registration, and then outputs these values to a user.

2. Description of the Related Art

Scanners typically employ a lens to focus light from an image (e.g., a document image, a graphics image, etc.) onto a detector, such as a charge coupled device (hereinafter "CCD"). The detector, in turn, converts light from the document image into electrical signals, from which data corresponding to the document image is generated. As might be expected, the accuracy of this data is based on the quality of the lens used to focus the light from the document image. In particular, the accuracy of the data is dependent, at least in part, upon the modulation transfer function (hereinafter "MTF") of the lens.

The MTF of a lens defines how sharply the lens is able to focus. That is, for a line pattern having a particular frequency, such as 35 line-pairs-per-millimeter (hereinafter "lp/mm"), the MTF corresponds to the contrast of an image formed by the lens relative to a contrast of an original image. A high MTF value is, of course, preferable, since it means that the lens will have high contrast and, therefore, will provide more accurate document imaging. Accordingly, systems have been devised to test a lens' MTF values at discrete spatial frequencies. Specifically, such systems focus light from a target having a known line pattern of a particular frequency in lp/mm, through the lens, and onto a CCD. Thereafter, the MTF of the lens at the frequency of the target line pair pattern is determined mathematically based on the light received from the lens. One problem with this method is that in order to determine the lens MTF at a plurality of frequencies, a plurality of line patterns, each having a lp/mm frequency of a desired MTF frequency to be measured, is required to be placed on the target.

Other problems also exist with conventional lens testing systems because those systems are not able to obtain a through-focus MTF for the lens, and do not take into account the MTF of the CCD, among other things, when determining the lens' MTF. That is, the MTF of the CCD affects the image data generated from the light incident on the CCD. Thus, conventional lens testing systems, which do not account for the MTF of the CCD, are unable to determine a lens MTF accurately.

Another problem which exists with conventional lens testing systems is that a lens may not be tested over its full field of view. Systems which test a lens in the center of the field of view are known and it is known to translate a test apparatus from the center of the field of view to the extreme edges of the field of view and to repeat the test at each location of the field of view for which the lens performance is to be tested. It is desirable, especially in scanning systems to determine the lens performance characteristics e.g. MTF, distortion and color registration as well as other lens characteristics at a plurality of field positions along the lens field of view and to reduce the time and expense of performing a separate lens test at each of the plurality of field positions along the lens field of view for which test data is required.

Moreover, conventional lens testing systems do not test other properties of a lens which can affect light transmission and thus document imaging. Examples of these other properties include color registration, focal length, and distortion each of which may vary along the field of view of the lens and through the lens depth of field. Distortion refers to the amount that an image is distorted when light is transmitted through the lens. As might be expected, the less distortion that a lens produces, the better. Color registration refers to differences in light transmission for different wavelengths (i.e., colors) of light. That is, a lens may transmit different colored light to different locations, e.g. each color light may have a unique focal plane, thereby leading to registration errors between different colors of the same image. These registration errors can significantly affect the way in which a color image is perceived. Last, but not least, a lens' focal length affects its ability to transmit light accurately.

For at least the foregoing reasons, conventional lens testing systems are inadequate, particularly with respect to testing lenses for use with document scanners or other types of imaging systems. Accordingly, there exists a need for a lens testing system which addresses the foregoing drawbacks of conventional lens testing systems. In particular, there exists a need for a lens testing system which is able to provide an accurate, through-focus measurement of a lens MTF. In addition there exists a need for a lens testing system which is able to quickly provide a measure of a lens MTF, and other lens properties, such as distortion, color registration, and focal length at several field locations.

SUMMARY OF THE INVENTION

The present invention addresses the foregoing needs.

Specifically, in one aspect, the invention is a system for determining one or more properties of a lens, which includes a light source and a target pattern mounted relative to the light source so that the light source illuminates the target pattern and so that light transmitted through the target pattern is transmitted through the lens. In the system, a detector detects the light transmitted through the lens, and outputs analog electrical signals corresponding to features of the target pattern. Preferably the target pattern is positioned at a first conjugate position of the lens and an active surface of the detector is positioned at a second conjugate position of the lens, corresponding to a position of an image of the target pattern formed by the lens.

In order to determine a depth of focus of the lens under test and in order to select an ideal operating position of a lens within a scanner system, the detector is movably mounted so as to be movable along an optical axis of the lens under test. The detector is capable of movement to a plurality of discrete positions on either side of the second conjugate position of the lens such that the detector moves relative to the image formed by the lens. A generator (e.g., an electronics interface box) includes an analog to digital, (A/D) converter to convert the analog electrical signal from the detector to a digital signal representative of analog electrical signal output from the detector in response to the image on the active surface. A memory stores computer-executable process steps and a processor executes the process steps stored in the memory so as to obtain an MTF value of the lens based on the digital signal.

Thus, unlike its conventional counterparts, the present invention is able to obtain a relatively accurate through-focus MTF for a lens. In preferred embodiments, the invention may also obtain a focal length of the lens, a distortion of the lens, and/or a color registration error of the lens, based on processing of the digital signal. Thus, these embodiments of the invention are able to test a lens' MTF in addition to other relevant lens properties. As a result, the invention is able to provide more comprehensive lens testing than its conventional counterparts.

In preferred embodiments of the invention, the processor executes process steps stored in the memory so as to perform one or more corrections on the MTF value of the lens. Such corrections may include corrections to take into account MTF values of the detector. By correcting the lens MTF in accordance with the MTF of the detector, the invention is able to obtain more accurate lens MTF measurements than the conventional systems described above.

In some embodiments of the invention, the foregoing corrections include correcting the lens MTF to account for other factors which may affect measurement of the lens MTF. These factors include a wavelength of the light used to illuminate the target pattern and sampling the lens MTF at a plurality of discrete positions of the detector. In these embodiments, the accuracy of the lens MTF obtained by the invention is even further increased relative to MTFs obtained by the conventional systems described above.

In particularly preferred embodiments of the invention, the lens includes a plurality of field positions and the target pattern includes features corresponding to the field positions. In addition, the light source is capable of providing light comprised of a plurality of different colors. In these embodiments, the system includes a lens holder, which is capable of holding the lens at a plurality of rotational orientations about an optical axis of the lens. The processor therefore executes the process steps stored in the memory so as to obtain plural MTF values of the lens based on a rotational orientation of the lens about the optical axis, a position of the detector with respect to the image, a field position of the lens, and a color component of the light.

By virtue of the foregoing arrangement, it is possible to obtain plural MTF values which take into account different factors, such as light color, depth of focus, lens distortion at various field positions and the like. Moreover, because the system uses a detector driving mechanism to automatically move the detector and a processor, which may control movement of the detector, the invention is able to perform comprehensive lens testing more quickly than has heretofore been possible; in some cases in even less than five minutes.

In still another preferred embodiment of the invention, the processor executes the process steps stored in the memory so as to determine a depth-of-focus for the lens based on the plural MTF values for the plurality of detector positions described above. That is, the MTF values for each of the plurality of positions may be used to define a plurality of curves, each of which defines an MTF of the lens in terms of a focus position for a particular lens rotational orientation, a particular field position, and a particular light color. In this case, the depth-of-focus for the lens is based on at least one of these curves and, for a particular modulation transfer frequency, is determined based on the difference between points on one or two of the plurality of curves. Thus, the present invention also provides a way to determine the depth-of-focus of the lens, in addition to the other properties noted above.

According to another aspect, the invention is a method that corresponds to the system described above. In particular, this aspect of the invention is a method of determining one or more properties of a lens. The method includes the steps of illuminating a target pattern, positioned at a first conjugate position of the lens, with light from a light source so that light transmitted through or reflected from the target pattern is transmitted through the lens; and, positioning an active surface of the detector substantially at the second conjugate position of the lens such that the detector provides an analog electrical signal in response to the image falling thereon. The method also includes converting the analog electrical signal to a digital signal representative of the image and processing the digital signal to obtain an MTF of the lens based on the image.

This brief summary has been provided so that the nature of the invention may be understood quickly. A more complete understanding of the invention can be obtained by reference to the following detailed description of the preferred embodiment thereof in connection with the attached drawings.

BRIEF DESCRIPTION OF THE DRAWINGS

FIG. 4 shows a dialog box used to input test parameters into the routine used by the lens testing system.

FIG. 14 is a display window showing output test results from the lens testing system of the present invention.

DETAILED DESCRIPTION OF THE PREFERRED EMBODIMENT

Figure 1A:
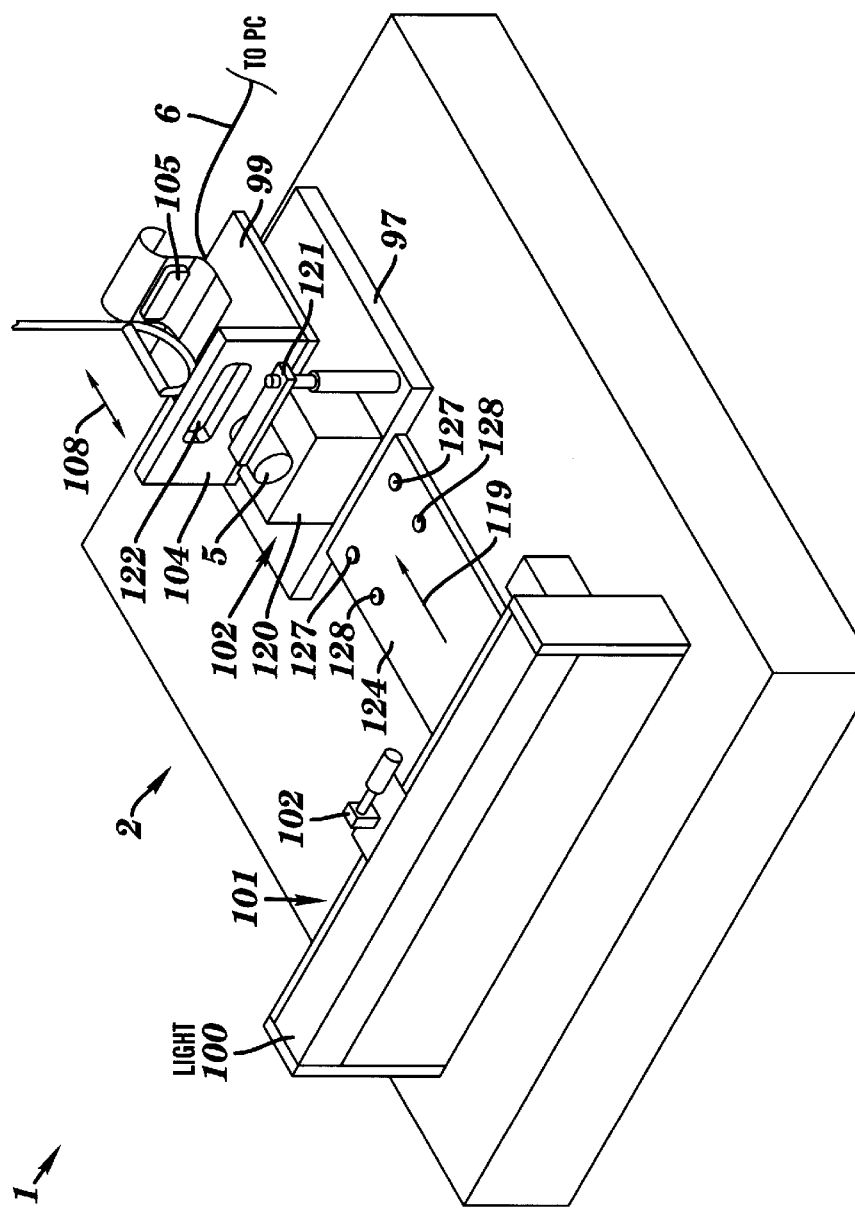
FIG. 1, comprised of FIGS. 1A and 1B, shows components of a lens testing system in accordance with the present invention.
Figure 1B:
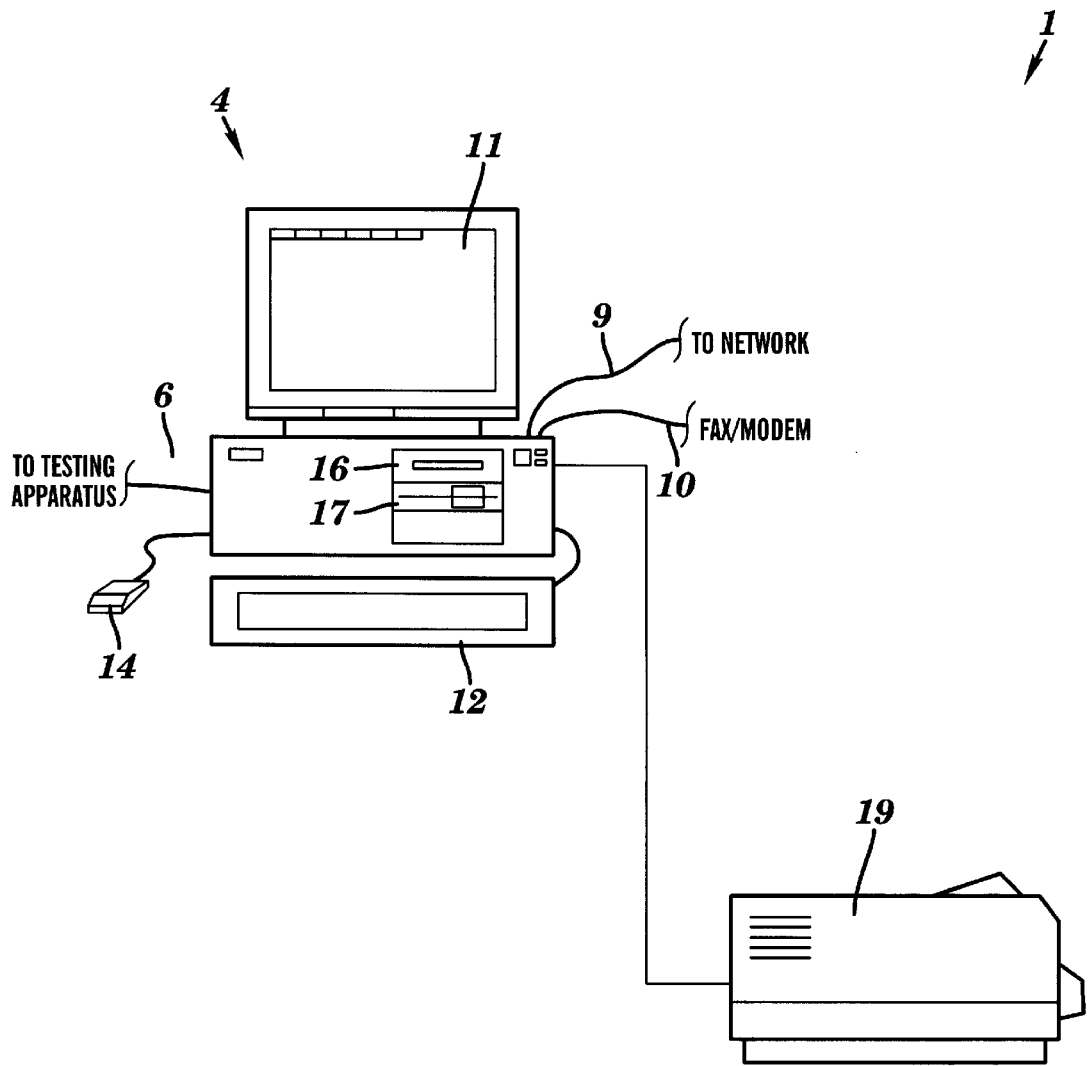

FIGS. 1A and 1B show a representative embodiment of a lens testing system in accordance with the present invention. As shown in FIGS. 1A and 1B, lens testing system 1 includes testing apparatus 2, electronics interface box 3, and personal computer (hereinafter "PC") 4, among other things. In brief, testing apparatus 2 determines certain performance characteristics of a lens 5 to be tested by using the lens 5 to relay an image of an illuminated test target 101, located at a first conjugate position of the lens 5 onto an analog detector or light sensor 105 positioned at an appropriate second conjugate position of the lens 5. An analog electrical signal generated by the detector 105 in response to being illuminated by an image of the test target 101 is transmitted to an interface box 3 which may amplify or otherwise modify or enhance the analog electrical signal and which then converts the analog electrical signal to a digital signal representative of the analog electrical signal. Once the electronics interface box 3 has converted the electrical signals into a digital signal, the digital signal is transmitted to the PC 4 for digital signal processing and analysis. PC 4 processes the digital signals in order to obtain, for each lens being tested, a lens MTF value, a lens distortion value, a lens color registration error value, and/or a lens focal length or preferred operating position.

PC 4 preferably comprises a 120 MHz-P5 PC with 32 MB of RAM; although other computers may be used instead. As shown in FIG. 1B, test data and control signals are transmitted between testing apparatus 2 and PC 4 via electronics interface box 3. Alternatively, test data and control signals may be transmitted between PC 4 and a remote electronics interface box (not shown) via a local area network ("LAN") or via the Internet. To facilitate such transmission, PC 4 includes network connection 9 for interfacing to a network, and fax/modem connection 10 for interfacing with other remote sources. As shown in FIG. 1, PC 4 also includes display screen 11 for displaying information to a user, keyboard 12 for inputting text and user commands, mouse 14 for positioning a cursor on display screen 11 and for inputting user commands, disk drive 16 for reading from and writing to floppy disks installed therein, and CD-ROM drive 17 for accessing information stored on CD-ROM. PC 4 may also have one or more peripheral devices, such as a printer 19, attached thereto for outputting images, text, or the like.

Figure 2:
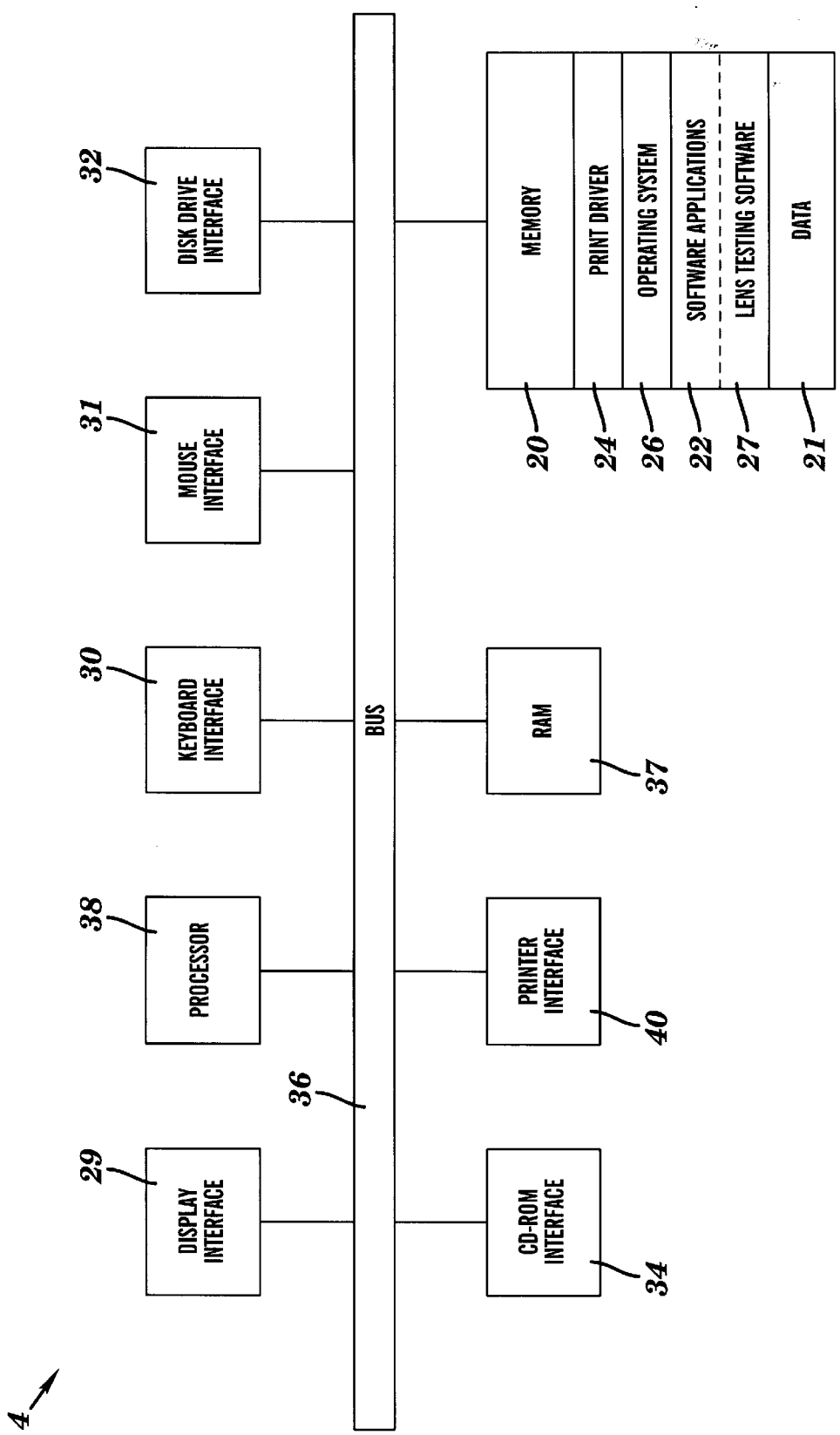
FIG. 2 shows the internal structure of a personal computer used in the lens testing system.

FIG. 2 shows the internal structure of PC 4. As shown in FIG. 2, PC 4 includes memory 20, which comprises a computer-readable medium such as a computer hard disk. Memory 20 stores data 21, applications 22, print driver 24, and an operating system 26. In preferred embodiments of the invention, operating system 26 is a windowing operating system, such as Microsoft Windows95®; although the invention may be used with other operating systems as well. Among the applications stored in memory 20 is lens testing routine 27. Lens testing routine 27 comprises computer-executable process steps which obtain, for a lens under test, its MTF, distortion, color registration error, and/or focal length. A detailed description of the operation of lens testing routine 27 is provided below.

Also included in PC 4 are display interface 29, keyboard interface 30, mouse interface 31, disk drive interface 32, CD-ROM drive interface 34, computer bus 36, RAM 37, processor 38, and printer interface 40. Processor 38 preferably comprises a microprocessor or the like for executing applications, such as lens testing routine 27 noted above, out of RAM 37. Such applications may be stored in memory 20 or, alternatively, on a floppy disk in disk drive 16 or a CD-ROM in CD-ROM drive 17. In this regard, processor 38 accesses applications (or other data) stored on a floppy disk via disk drive interface 32 and accesses applications (or other data) stored on a CD-ROM via CD-ROM drive interface 34.

Application execution and other tasks of PC 4 may be initiated using keyboard 12 or mouse 14, commands from which are transmitted to processor 38 via keyboard interface 30 and mouse interface 31, respectively. Output results from applications running on PC 4 may be processed by display interface 29 and then displayed to a user on display 11. To this end, display interface 29 preferably comprises a display processor for forming images based on data provided by processor 38 over computer bus 36, and for outputting those images to display 11. Output results from applications running on PC 4 may also be provided to printer 19 via printer interface 40. In this case, processor 38 executes print driver 24 so as to perform appropriate formatting of the output results prior to their transmission to printer 19.

Returning to FIG. 1B, electronics interface box 3 is connected in series with PC 4 and lens testing apparatus 2. Electronics interface box 3 includes a digital processor, an A/D converter for converting the analog electrical signal received from the detector 105 into a digital signal representative of the electrical signal and one or more memories for storing "primitives". These primitives comprise processor-executable routines which emulate the functions of a scanner system similar to the scanner system for which the lens under test will be used.

Similarly the detector or light sensor 105 is preferably the same detector which is used in the scanner system in which the lens under test will be used. In the present invention, a tri-linear Charge Coupled Device, (CCD), is employed for testing the lens to be tested. Such a tri-linear device may include three separate color channels, e.g. red, green and blue. In this case a row of detector elements or pixels forming an active surface is masked by a red filter such that the red masked row of pixels provides an electrical signal only in response to a red component of light source falling thereon. Likewise, a row of pixels is masked by a green and a blue filter to only provide an electrical signal in response to green or blue light. Tri-linear CCD elements are well known in the art and are available, e.g. from Eastman Kodak of New York or Loran Corp. of Massachusetts. The present invention, however, is not limited to tri-linear CCD arrays and may employ other light sensing devices, e.g. a single color device, a one dimensional or two dimensional CCD array or other silicon based light sensing elements. The choice of detector may depend on the particular characteristics of the lens which are to be evaluated or on the characteristics of the system which will employ the lens.

In the present invention, three electrical signals, one for each color channel, red, green or blue, are received by the electronic interface box 3 from the tri-linear CCD. The electronic interface box 3 therefore processes all three analog color signals which in this present invention are multiplexed through a single processing channel but which may be separately processed by three processing channels. In this case, three distinct red, green and blue digital signals are provided to the PC 4 for analysis.

Figure 3:
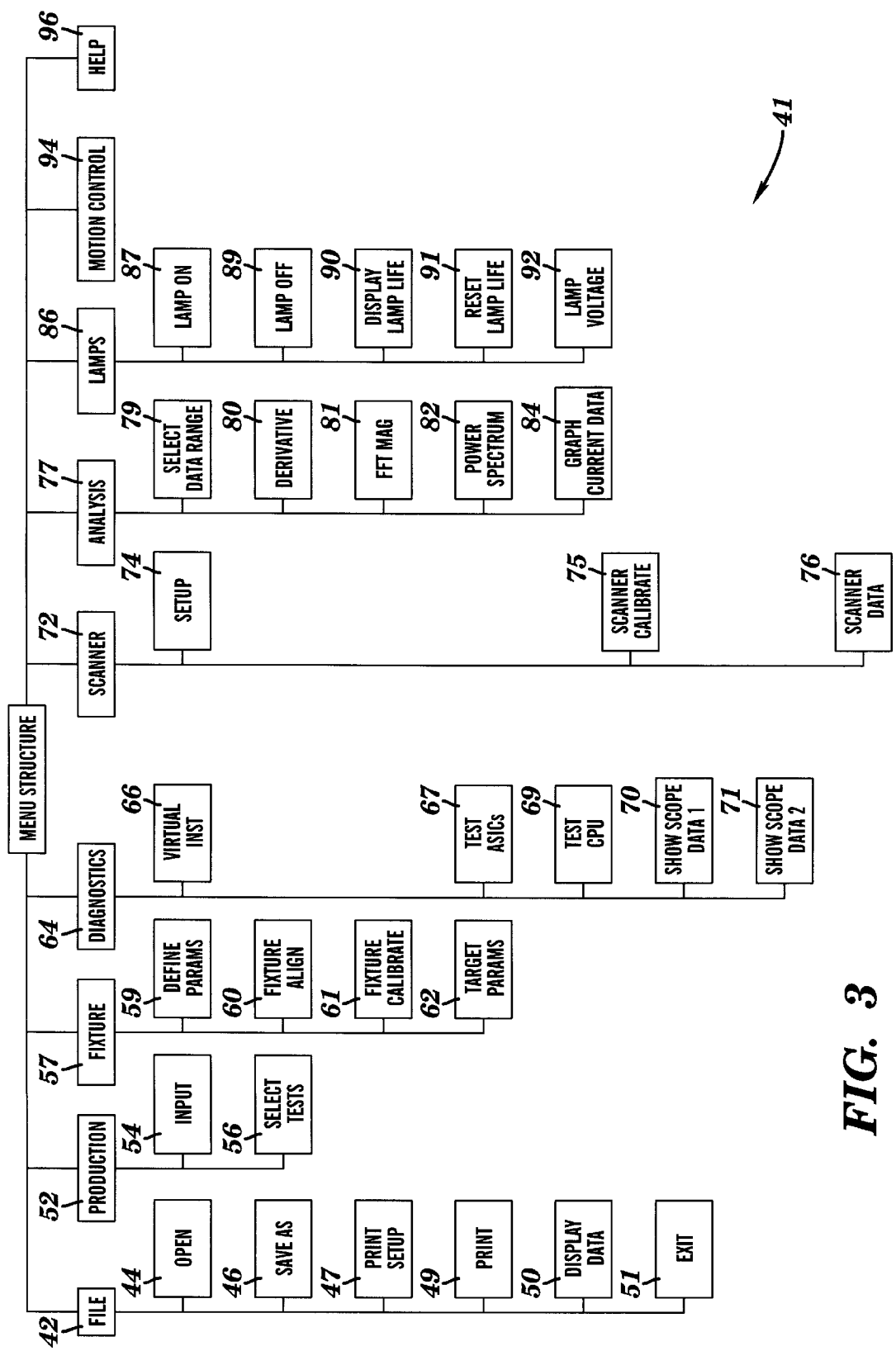
FIG. 3 shows the menu structure of a lens testing routine used in the lens testing system.

Motor drive box 8 controls movement of the slide assembly 97 on testing apparatus 2, as described in more detail below. FIG. 3 shows a preferred menu structure 41 for lens testing routine 27. This menu structure may be displayed on display screen 11 so as to allow a user to control, and interact with, lens testing routine 27. Brief descriptions of the functions of menu options in menu structure 41 are provided below. The function of many of these menu options, however, will become more apparent in the detailed description of the lens testing process described below.

As shown in FIG. 3, "File" option 42 includes "Open" option 44, "Save As" option 46, "Print Setup" option 47, "Print" option 49, "Display Data" option 50, and "Exit" option 51. "Open" option 44 allows a user to open a file containing the results of a previous lens testing operation and to view the results thereof. "Save As" option 46 saves a current set of data, including input test parameters and/or lens test results, to a designated file. "Print Setup" option 47 configures printer 19 to print data, such as graphics or text, and allows a user to enter a heading for a window being printed. "Display Data" option 50 displays statistics relating to previously-performed lens tests. "Exit" option 51 quits lens testing routine 27.

"Production" option 52 includes "Input" option 54 and "Select Tests" option 56. "Input" option 54 allow a user to start a lens testing operation by displaying a data entry dialog box for entering necessary data, such as the serial number of the lens under test. "Select Tests" option 56 allows a user to choose whether to perform a test for a high-resolution lens (e.g., a lens having a resolution of 2500 dpi) or a test for a low-resolution lens (e.g., a lens having a resolution of 540 dpi).

"Fixture" option 57 includes "Define Params" option 59, "Fixture Align" option 60, "Fixture Calibrate" option 61, and "Target Params" option 62. "Define Params" option 59 opens a dialog box, in which a user may set any necessary parameters to be used during the lens testing process. An example of such a dialog box is shown in FIG. 4, and is described in greater detail below. "Fixture Align" option 60 calls routines for aligning testing apparatus 2 prior to testing. "Fixture Calibrate" option 61 calls routines for calibrating testing apparatus 2. This process is described in more detail below. "Target Params" option 62 sets initial locations of all edge positions on a target pattern used during lens testing.

"Diagnostics" option 64 includes "Virtual Inst." option 66, "Test ASICS" option 67, "Test CPU" option 69, "Show Scope Data 1" option 70, and "Show Scope Data 2" option 71. "Virtual Inst." option 66 allows configuration of any virtual instruments used in testing apparatus 2. In this regard, in preferred embodiments of the invention, lens testing routine 27 has direct access to raw data from a detector on testing apparatus 2 using a virtual oscilloscope. "Show Scope Data 1" option 70 and "Show Scope Data 2" option 71 display such raw data on display screen 11. "Test ASICS" option 67 performs diagnostic tests on circuitry used in electronics interface box 3 (e.g., application-specific integrated circuits), and "Test CPU" option 69 performs diagnostic tests on the processor in electronics interface box 3.

"Scanner" option 72 includes "Setup" option 74, "Scanner Calibrate" option 75, and "Scanner Data" option 76. "Setup" option 74 calls computer-executable routines to control reading of data from a detector on testing apparatus 2. "Scanner Calibrate" option 75 calls basic calibration routines for calibrating testing apparatus 2 in the manner described below. "Scanner Data" option 76 calls routines to collect data from electronics interface box 3.

"Analysis" option 77 includes "Select Data Range" option 79, "Derivative" option 80, "FFT Mag." option 81, "Power Spectrum" option 82, and "Graph Current Data" option 84. "Select Data Range" option 79 selects a range of data to keep as current. "Derivative" option 80 takes the derivative of the current data. "FFT Mag." option 81 performs a fast Fourier transform (hereinafter "FFT") on the current data and takes the resulting normalized magnitude. "Power Spectrum" option 82 performs a power spectrum analysis on the current data. "Graph Current Data" option 84 graphs the current data. The use to which the lens testing system of the present invention puts these functions is apparent from the description provided below.

"Lamps" option 86 includes "Lamp On" option 87, which turns on a light source in testing apparatus 2; "Lamp Off" option 89, which turns off the light source; "Display Lamp Life" option 90, which displays to a user an estimated remaining operational time of the light source; "Reset Lamp Life" option 91, which resets the operational time of the light source (for use upon installation of a new light source); and "Lamp Voltage" option 92, which displays the amount of voltage being used by the light source. "Motion Control" option 94 controls movement of a detector, described below, on testing apparatus 2. "Help" option 96 provides help messages for use during the lens testing process described below. Of course, other options may be included in the menu structure described above, as needed. Likewise, certain ones of the foregoing menu options may be deleted, or the organization thereof altered in any number of ways.

Returning to FIG. 1A, a description will now be provided for testing apparatus 2. Testing apparatus 2 includes slide assembly 97, detector driving mechanism 99, light source 100, target pattern 101, target pattern holder 102, lens holder 103, plate mount 104, and detector 105. As described in more detail below, detector 105 preferably includes a CCD or the like which provides an active surface which is capable of detecting light incident thereon, together with additional circuitry (not shown) outputting analog electrical signals in accordance with the incident light. These analog electrical signals, which in the present invention correspond to detector signals as described above, are then transmitted to electronics interface box 3. Electronics interface box 3 generates digital signal based on the analog electrical signals received from the detector. As noted, PC 4 receives the digital signals from electronics interface box 3 and processes the digital signals in the manner described below.

Light incident on detector 105 is generated, ultimately, by light source 100. In this regard, light source 100 preferably comprises a lamp having spectral properties similar to those of lamps used in a document scanner. In preferred embodiments of the invention, the lamp outputs white light which, as is well known, is comprised of red, green and blue light components. A diffusor (not shown) may be provided at the output of light source 100 so as to increase its uniformity of illumination. Control over light source 100 is provided by lens testing routine 27. Specifically, lens testing routine 27 controls when light source 100 turns on and when light source 100 turns off, as well as light intensity in some embodiments of the invention, by transmitting control signals from PC 4 through electronics interface box 3. The menu structure provided above describes, in more detail, various options for controlling light source 100.

Figure 5:
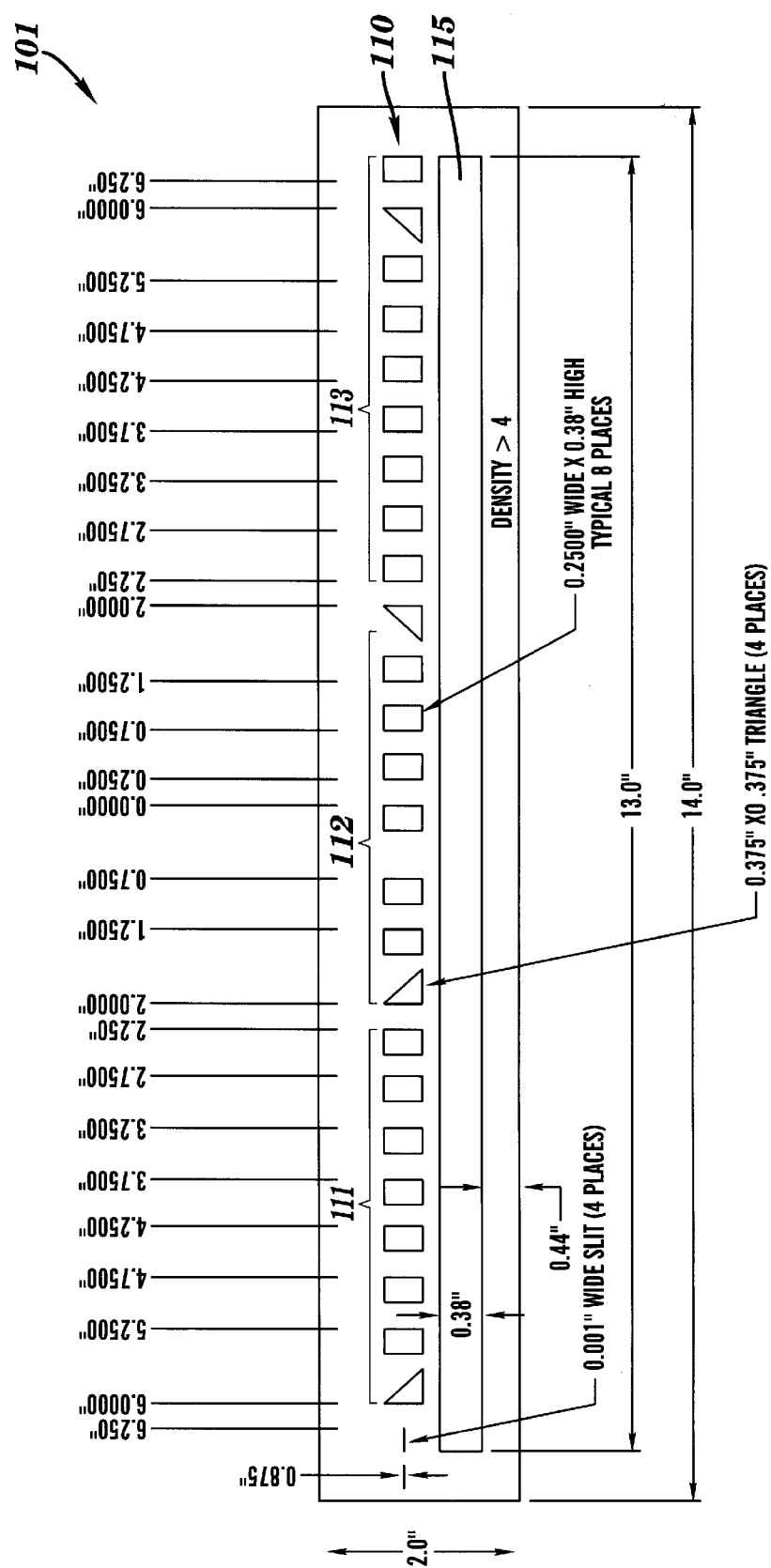
FIG. 5 shows a close-up view of a target pattern used in the lens testing system.

Target pattern holder 102 holds a target pattern, such as target pattern 101 shown in FIG. 5, in front of light source 100. The target pattern 101 comprises an opaque metallic substrate which includes a plurality of features 110, such as apertures, or slits, passing therethrough and arranged in a target pattern which is back-illuminated by the light source 100 such that light passes through the features 110. Alternately, a glass substrate may be used. In this case, a glass substrate is masked by a substantially opaque background region, which prevents light from the light source 100 from reaching the detector 105. The features 110 may then be formed in the masked opaque background, e.g. by a photo-etching process which is well known.

In preferred embodiments of the invention, target pattern holder 102 holds target pattern 101 one half inch from a lamp in light source 100, so as to back-illuminate the target pattern. As detailed above, an image of the test target pattern 101 is formed onto the active surface of the detector 105 by the lens 5. In the preferred embodiment of the invention, the active surface of the detector comprises only a single row of pixels for each color, red green or blue, such that only a very narrow portion of the image of the test target pattern 101 is actually sampled by the detector. As shown in FIG. 5, the features 110 include rectangular and triangular apertures. In this case, the triangular apertures provide a reference as to the vertical position of the target pattern 101 with respect to the detector 105 and the lens 5 since the width of triangular aperture varies with vertical position. By analyzing the electrical signal, of the detector, corresponding to a triangular aperture of the target pattern 101 the vertical position of the target pattern can be determined from the electrical signal.

As shown in FIG. 5, similarly shaped features 110 are located on each side of target pattern 101, making target pattern 101 substantially symmetric about its center axis. The features can be divided into three groups, namely groups 111, 112 and 113, each of which is preferably about four inches in length. Group 112, is substantially centered with respect to a center field position of the lens 5 and is generally used to test the lens response in the center of the lens field of view. Group 112 is used in testing small field of view lenses, e.g. high resolution lenses. Groups 111 and 113 are substantial positioned at distal ends of the target pattern which correspond to distal ends of the lens field of view and are generally used in testing the lens performance in these areas. Groups 111 and 113 are used in testing larger field of view lenses, e.g. low resolution lenses. This testing process is described in greater detail below.

As also shown in FIG. 5, target pattern 101 includes calibration zone 115. Calibration zone 115 comprises an aperture or clear area which is clear over the entire field of view of the lens 5 and which is filled by illuminating energy from the light source 100, for calibrating testing apparatus 2. To this end, target pattern holder 102 includes a drive mechanism, which facilitates movement of target pattern 101 relative to light source 100 such that target pattern 101 moves vertically relative to light source 100 so that light source 100 illuminates either the features 110 or the calibration zone 115 to either calibrate the lens tester when the calibration zone 115 is illuminated or to test the lens 5 when the features 110 are illuminated.

Lens 5 is held in place by lens holder 103, which is capable of holding lens 5 at a plurality of different rotational orientations, meaning that the lens can be rotated about an optical axis thereof and held in place by lens holder 103 at different angles of rotation with respect to the optical axis. Lens holder 103 includes V-block 120 and clamp 121. V-block 120 supports lens 5. In preferred embodiments of the invention, V-block 120 is perpendicular to target pattern 101 within 15 arc-seconds, and an optical axis of lens 5 is mounted parallel to V-block 120 within 15 arc-seconds. Clamp 121 is preferably a simple spring clamp which is movable vertically so as to allow placement of lens 5 on V-block 120, and to allow subsequent clamping of lens 5 to V-block 120. Finally, lens holder 103 may include an adapter (not shown), so as to allow lens holder 103 to hold lenses having different diameters. This feature of the invention has particular utility in testing different resolution lenses, since different resolution lenses tend to have different diameters.

As shown in FIG. 1, testing apparatus 2 also includes plate mount 104, which is disposed between lens 5 and detector 105. Plate mount 104 includes hole 122 therein which substantially aligns to features 110 or calibration zone 115 in target pattern 101, depending upon which of these features is moved in front of light source 100 by the drive mechanism of target holder 102. Thus, light passes from light source 100, through target pattern 101, through lens 5, through hole 122, and onto an active region of a detector 105. To this end, the active surface of detector 105 is preferably substantially parallel with target pattern 101 (within 15 arc-seconds) and perpendicular with an optical axis of the lens 5. As noted above, detector 105 preferably comprises a CCD, such as a Kodak® 10,200 element tri-linear CCD having a 7 µm pixel size, and may include additional "scanner-like" circuitry for generating analog electrical signals based on light incident on the CCD.

In this regard, the CCD is aligned to target pattern 101 and to lens 5 so that light from target pattern 101 passes through lens 5 and forms images onto the CCD. Thus, in operation, the CCD on detector 105 detects light from target pattern 101 which has been transmitted through lens 5, and generates electrical signals corresponding to an image of the features of target pattern 101. Preferably, detector 105 includes light filters, e.g., red, green, and blue filters, on different areas thereof which enable detector 105 to separately detect color components of the light transmitted from target pattern 101. Detection of different color components of the light source is used in the testing process described below.

Detector 105, detector driving mechanism 99, lens holder 103 and lens 5 are mounted on slide assembly 97, as shown in FIG. 1. Slide assembly 97 moves these components along track 124 relative to target pattern 101 and light source 100. Specifically, slide assembly 97 moves detector 105 and lens 5 to a requisite conjugate position, meaning a position at which light from target pattern 101 passes through lens 5 and is substantially focused on detector 105 thereby forming an image of the entire target pattern 101 or a portion of the target pattern 101 onto an active region of the detector 105. In this case, the lens and detector are move to a position which places the target pattern at a first conjugate position of the lens and the detector is positioned substantially at a second conjugate position of the lens. In this regard, track 124 preferably includes two (or more) reference positions marked thereon—one for testing relatively high-resolution lenses and one for testing relatively low-resolution lenses but in general the reference marks correspond to different focal length lenses. These reference positions may include tooled steel stops thereat (not shown) for holding slide assembly 97 at a reference position.

In preferred embodiments of the invention, for a particular high-resolution lens, the reference position is such that the distance between target pattern 101 and detector 105 is roughly 243 mm, and for a particular low-resolution lenses, the reference position is such that the distance between target pattern 101 and detector 105 is roughly 550 mm. These distances of course depend on the focal length of the lens being tested and the conjugate positions of the target pattern 101 and the detector active surface. Ideally, the image of the target pattern formed by the lens onto the detector will just fill the active surface of the detector. Movement of slide assembly 97 along track 124, is preferably controlled by motor drive box 8 in response to commands generated by lens testing routine 27 which can be fashioned to automatically position the slide 97 to a position suitable for conducting a particular lens test. Alternatively, movement of slide assembly 97 may be effected manually, e.g., in response to prompts displayed on display screen 11, or the like.

Detector driving mechanism 99 comprises an actuator or the like which moves detector 105 relative to lens 5 and substantially along an optical axis of the lens in the directions of arrow 108 so the detector 105 is movable through a focal plane of the lens 5. In preferred embodiments of the invention, detector 105 is movable relative to lens 5 in increments of 0.05 mm over a specified range of 1 mm±0.5 mm which matches the particular depth of focus of the lenses being tested. Of course, the invention is not limited to these values, and any suitable increments or ranges can be used therewith, depending upon the depth of focus of the lens under test. Lens testing routine 27 in PC 4 controls detector driving mechanism 99 to move detector 105 by transmitting control signals from PC 4 to testing apparatus 2 via motor control box 8. As described in more detail below, image data is captured from lens 5 and then transmitted to PC 4 where properties of the lens are calculated.

In this regard, to begin the lens testing process, lens 5 is installed in lens holder 103 so that the lens is properly aligned to target pattern 101, to detector 105, and to hole 122 in plate mount 104. This includes placing lens 5 in V-block 120 and clamping lens 5 using clamp 121. In preferred embodiments of the invention, lens testing routine 27 displays detailed instructions for installing lens 5 in lens testing apparatus 2, and for performing all subsequent manual aspects of the testing procedure. Feedback may also be displayed, including final and preliminary test results, as described in more detail below.

Due to the geometry of testing apparatus 2, any difference in alignment (i.e., any tilt) between the CCD of detector 105 and target pattern 101 will be interpreted as a lens tilt, thereby artificially reducing a measured depth-of-focus. Accordingly, prior to testing, it is advantageous to check testing apparatus 2 for tilt between its CCD and target pattern, and to correct any tilt, if necessary.

In this regard, in preferred embodiments of the invention, lens testing routine 27 includes process steps (e.g., a subroutine) to compensate for tilt in testing apparatus 2 ("FixtureTilt"). This is done in the preferred embodiment of the present invention by measuring a depth-of-focus at left and right full field positions of lens 5, i.e. at distal ends of the test pattern. The system tilt ("SysTilt1") is then determined by subtracting the left depth-of-focus value from the right depth-of-focus value. Thereafter, the lens is rotated roughly 180°, thereby rotating the tilt component of the lens by 180°. The left/right depth-of-focus measurements are then repeated in order to obtain a second system tilt value ("SysTilt2"). Thus, in terms of apparatus tilt ("FixtureTilt") and lens tilt ("LensTilt"), equations for SysTilt1 and SysTilt2 are as follows:

FixtureTilt+LensTilt=SysTilt2

FixtureTilt−LensTilt=SysTilt2.

It is noted that the signs of LensTilt in the foregoing equations are different due to the 180° rotation of the lens described above. Combining (i.e., adding) the above two equations yields the following equation for FixtureTilt:

$$FixtureTilt = \frac{SysTilt1 + SysTilt2}{2}.$$

Once the tilt of testing apparatus 2, i.e., FixtureTilt, is known, it can be subtracted from, or added to, output data results from the testing processes described below in order to compensate for the tilt of testing apparatus 2. Alternatively, this data can be used to correct, mechanically, the tilt of testing apparatus 2. To facilitate mechanical tilt correction, "Tilt Correction" box 162 in dialog box 129 displays the amount of tilt of testing apparatus 2. Once tilt has been corrected, testing in accordance with the present invention may go forward.

Figure 6:
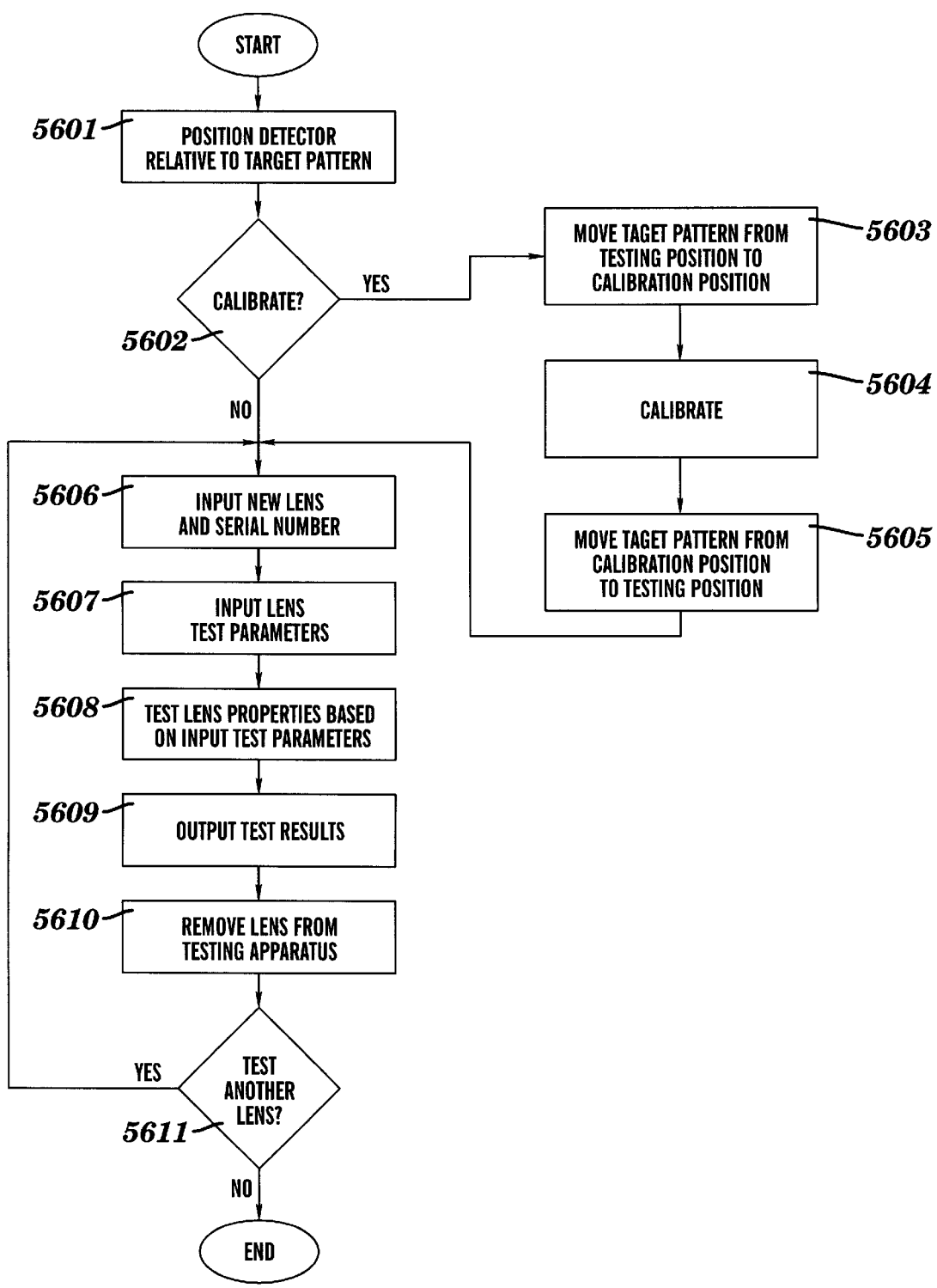
FIG. 6 is a flow diagram depicting the overall lens testing system of the present invention.

FIG. 6 is a flowchart showing a lens testing process in accordance with the present invention. Step S601 includes positioning slide assembly 97, which holds detector 105 and lens 5, along track 124 at a requisite conjugate distance for the lens being tested. Positioning of slide assembly 97 along track 124 in step S601 is performed based on the type of lens being tested. More specifically, as noted above, track 124 contains reference positions for use in testing high-resolution lenses and low-resolution lenses. In the case that the lens being tested is a high-resolution lens, step S601 comprises moving slide assembly 97 to a reference position on track 124 for testing a high-resolution lens. In a case that the lens being tested is a low-resolution lens, step S601 comprises moving slide assembly 97 to a reference position on track 124 for testing a low-resolution lens. As noted above, positioning of slide assembly 97 on track 124 may be performed manually, e.g., in response to prompts displayed on display screen 11, or automatically by lens testing routine 27.

Following step S601, processing proceeds to step S602. Step S602 comprises inputting the serial number of lens 5. This is done so as to facilitate matching of test data with each lens, and so as to perform any necessary calibrations or adjustments required for particular types of lenses. Thereafter, step S603 determines whether testing apparatus 2 is to be calibrated. This determination can be made by a user or, alternatively, by lens testing routine 27. Typically, calibration is performed before a lens is tested. However, it is noted that calibration of testing apparatus 2 is not necessary in all circumstances and, in fact, calibration can be eliminated totally from the process shown in FIG. 6. However, in a case that step S603 determines that calibration is to be performed, detailed instructions regarding procedures for calibrating testing apparatus 2 may be displayed on display screen 11 by lens testing routine 27. Thereafter, processing proceeds to step S604.

Step S604, which is performed by the drive mechanism in target holder 102, comprises moving target pattern 101 from a testing position to a calibration position (in a case that target pattern 101 is not already in the calibration position). In this regard, as noted above, target pattern 101 includes calibration zone 115 and slits 110. During testing, target pattern 101 is positioned relative to light source 100 so that slits 110 are illuminated thereby. On the other hand, during calibration, target pattern 101 is positioned relative to light source 100 so that calibration zone 115 is illuminated by light source 100 and so that light passing through the calibration zone on target pattern 101 is incident on detector 105. Thus, in step S604, the drive mechanism moves target pattern 101 so that calibration zone 115 is illuminated by light source 100.

Once target pattern 101 is in the calibration position, calibration is performed in step S605. More specifically, in step S605, white and/or black calibration is performed. Which type of calibration is performed may be set in lens testing routine 27. Lens testing routine 27 preferably controls the calibration process in much the same way that it controls the lens testing process. Thus, in a case that white calibration is performed, lens testing routine 27 causes light source 100 to turn on and thereby illuminate calibration zone 115. As a result, light from target pattern 101 passes through hole 122 in plate mount 104 and illuminates detector 105. Detector 105 includes circuitry (not shown) which determines the level of the light incident thereon, and which converts this information into corresponding analog signals. These signals are then transmitted to electronics interface box 3 which converts the analog signals into digital signals and transmits the digital signals to lens testing routine 27. This routine then adjusts the exposure level of the light source so as to maintain substantially constant illumination for each lens. An identical process is performed for black calibration, except that a cloth (or a similar light-blocking material) is placed over detector 105 so as to minimize the amount of light incident on the CCD in detector 105.

After white and/or black calibration data has been received by lens testing routine 27, this data is displayed to a user. In the event that the calibration data is unsatisfactory, adjustments may be made to testing apparatus 2, and the foregoing process repeated until satisfactory calibration results have been obtained. Once satisfactory calibration results have been obtained, processing proceeds to step S606, in which the drive mechanism moves target pattern 101 from the calibration position to the testing position so as to perform lens testing.

Next, processing proceeds to step S607. Step S607 comprises inputting lens testing parameters into lens testing routine 27. To this end, lens testing routine 27 displays a dialog box, such as dialog box 129 shown in FIG. 4, which permits a user to enter lens testing parameters. As described in more detail below, these lens testing parameters control the way in which lens testing routine 27 performs testing on a lens. Dialog box 129 also included entries which are pre-set by lens testing routine 27.

In more detail, dialog box 129 includes "Number FFT points" box 130, "Pixel Spacing" box 131, "Number focus positions", (discrete positions), box 132, "Focus increment" box 134, "MTF location" box 136, "Number bits/pixel" box 137, "Derivative threshold" boxes 139, "Number of orientations" box 140, "Number field positions" box 141, "Field Pos. 1" box 142, "Field Pos. 2" box 143, "Field Pos. 3" box 145, "Field Pos. 4" box 146, "Field Pos. 5" box 147, "Resolution" box 149, "Detect Footprint" box 150, "RED" box 151, "GREEN" box 152, "BLUE" box 154, "MTF for focus depth" box 156, "Minimum focus depth" box 157, "Maximum distortion" box 158, "Maximum color error" box 159, "Actuator speed" box 160, "Actuator accel." box 161, "Tilt Correction" box 162, and "Sampling" boxes 164. The function of each of these features of dialog box 129 is described in more detail below with respect to the lens testing process. At this point, suffice it to say that certain of the foregoing test parameters displayed in dialog box 129 can be changed in order to alter/control operation of the lens testing process described below.

Dialog box 129 also includes "OK" button 170, "Cancel" button 171, and "Write file" button 172. "OK" button 170 confirms inputs to dialog box 129 and "Cancel" button 171 closes dialog box 129 without saving inputs thereto. "Write file" button 172 causes lens testing routine 27 to write inputs to dialog box 129 to a file in memory 20. This file may then be called up, as desired, in order to fill in the boxes of dialog box 129, or for display to a user.

Figure 7:
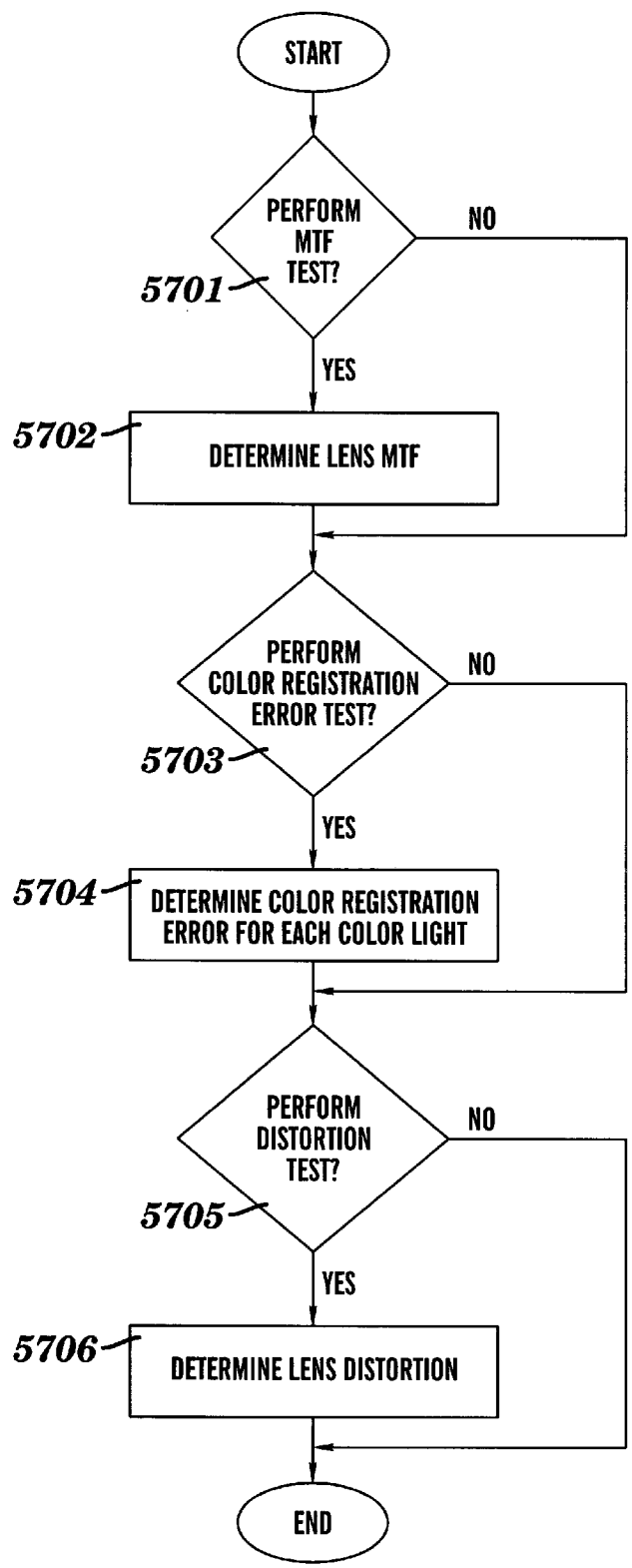
FIG. 7 is a flow diagram depicting specific tests performed by the lens testing system.
Figure 8A:
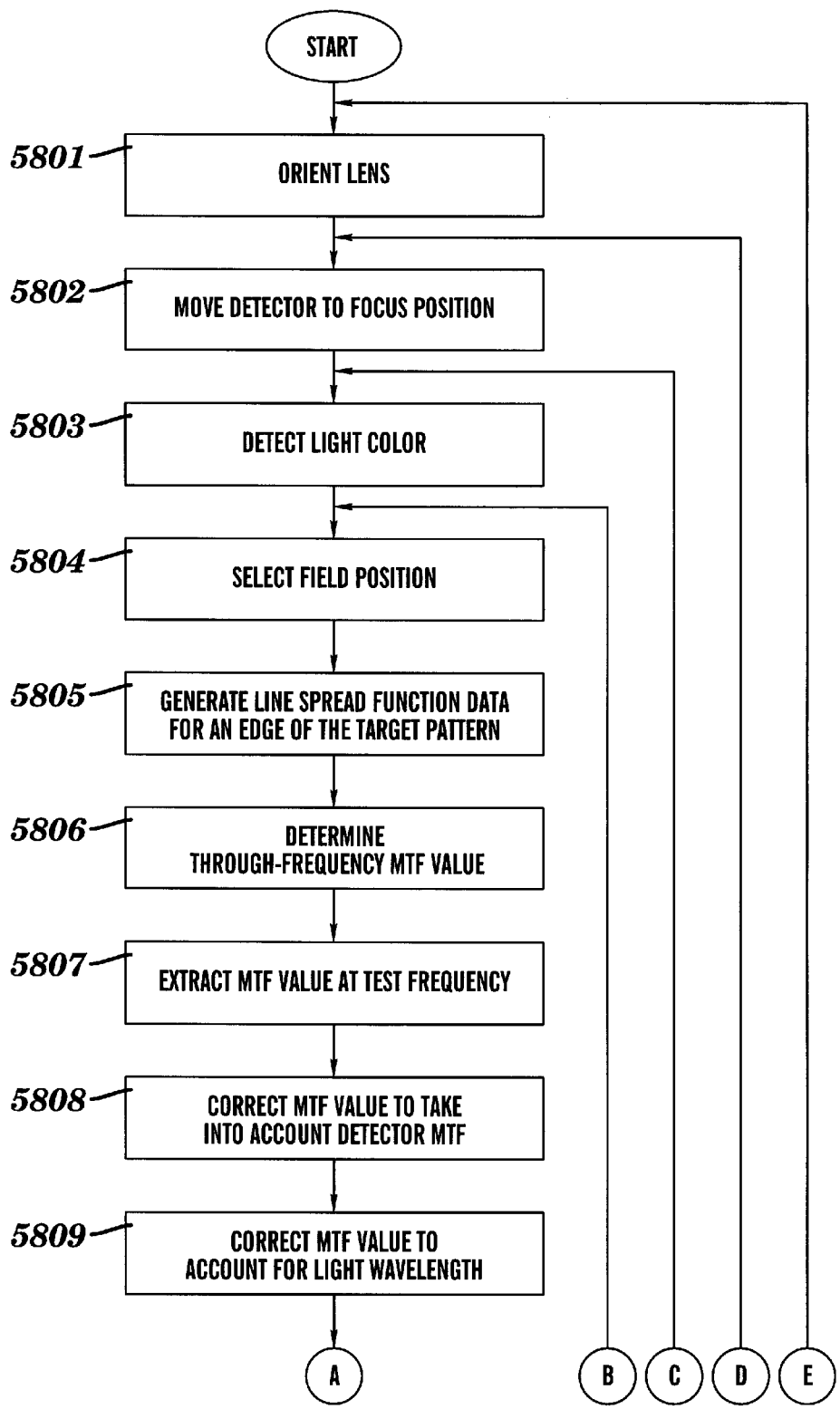
FIG. 8, comprised of FIGS. 8A, 8B and 8C, is a flow diagram depicting lens MTF testing in accordance with the present invention.
Figure 8B:
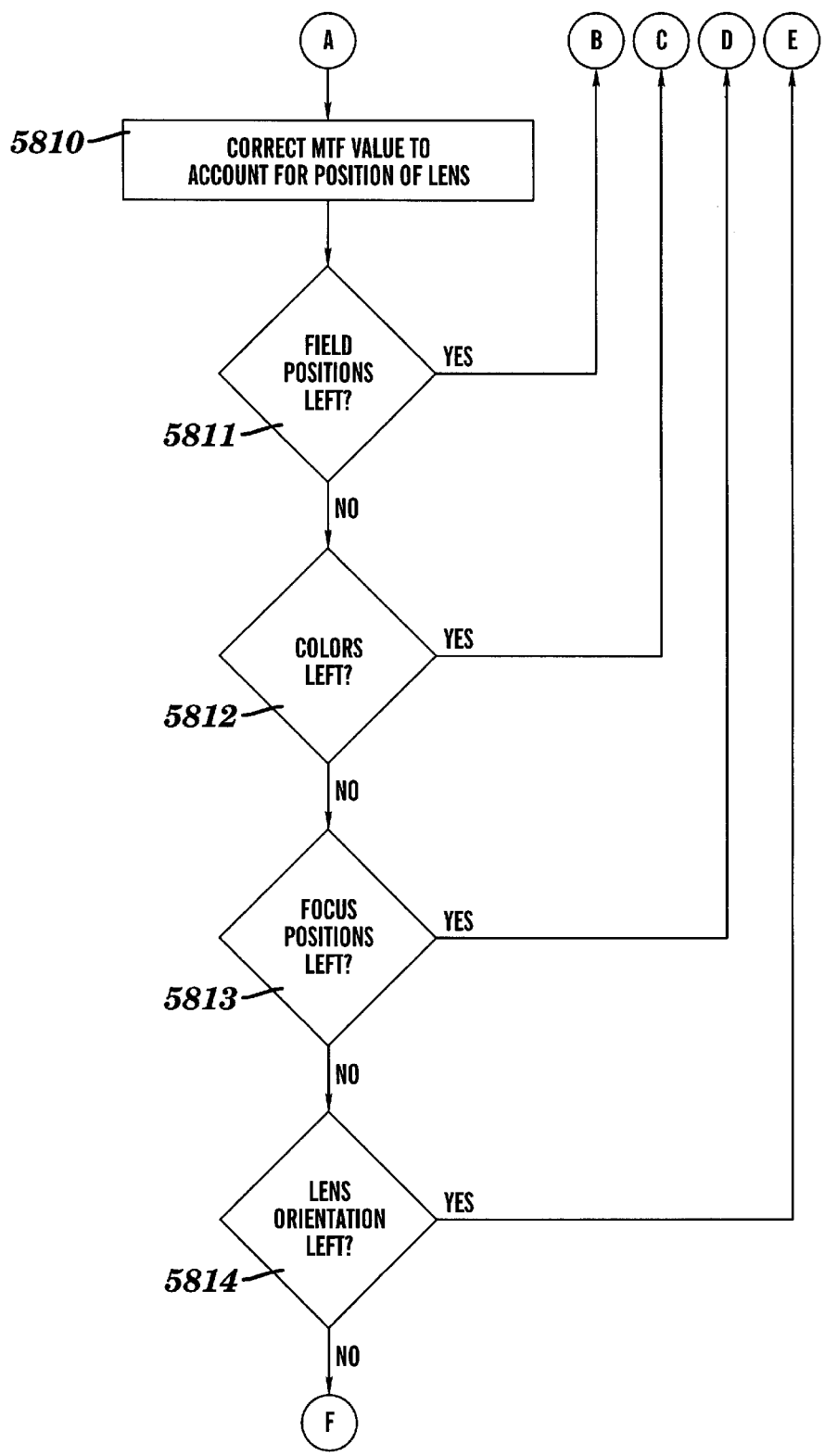
Figure 8C:
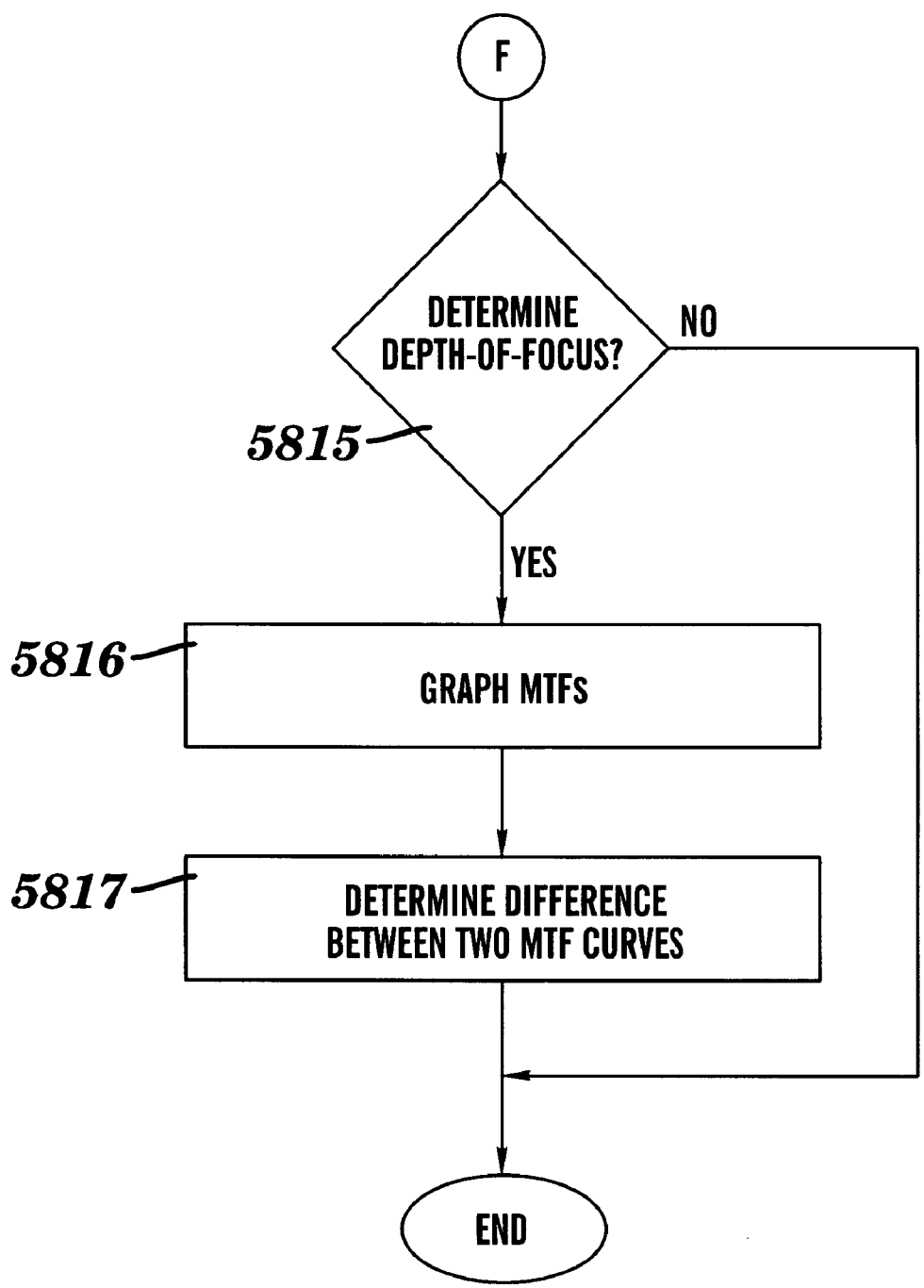

Following step S607, processing proceeds to step S608. Step S608 performs tests on lens 5 in accordance with the lens testing parameters input in step S607. FIG. 7 is a detailed flow diagram showing the operation of step S608. More specifically, step S701 of FIG. 7 determines whether to perform MTF testing on lens 5. In a case that step S701 determines that MTF testing is to be performed on lens 5, processing proceeds to step S702. FIG. 8 (comprised of FIGS. 8A, 8B and 8C) is a detailed flow diagram showing MTF testing in accordance with the present invention.

Figure 9:
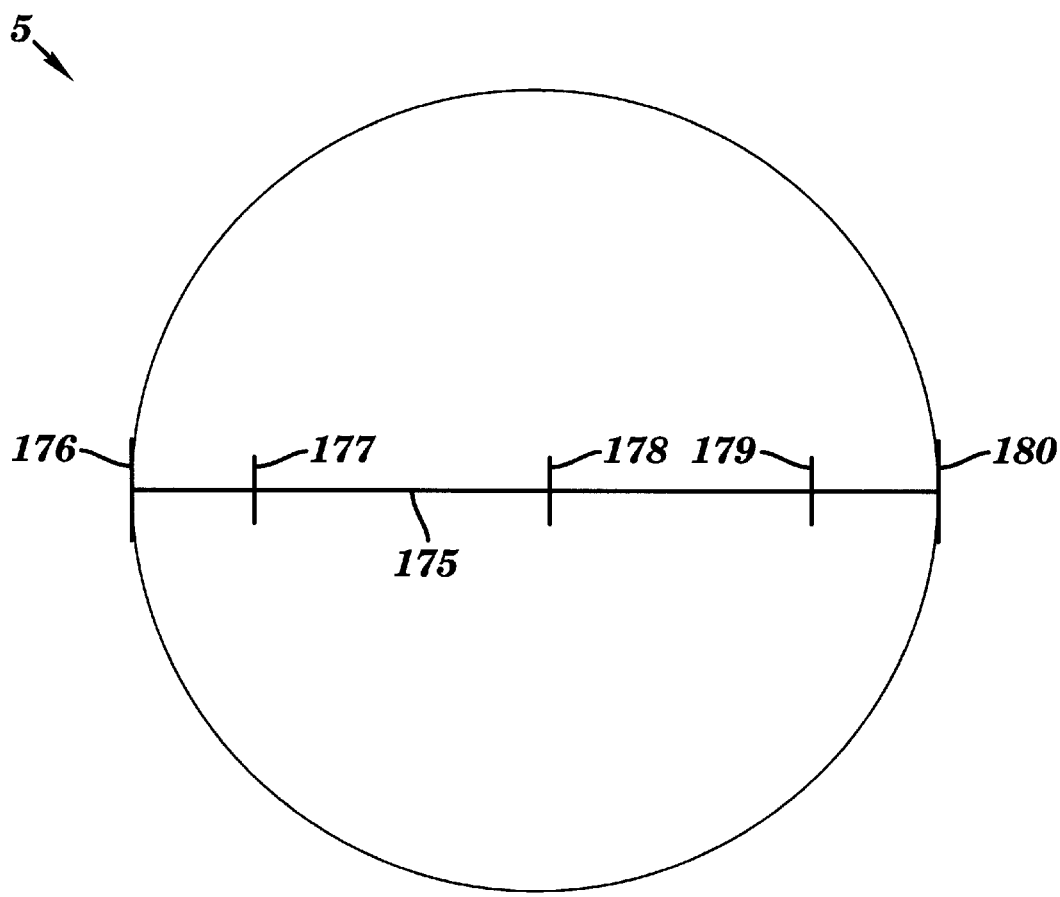
FIG. 9 is a close-up view of a lens showing field positions thereof.

In this regard, the MTF testing process shown in FIG. 8 comprises computer-executable process steps within lens testing routine 27. Briefly, these process steps comprise steps to obtain plural MTF values of lens 5 based on an orientation of lens 5 in lens holder 103, a color component of the light (e.g., red, green or blue light) from light source 100, a focus position of detector 105, and a field position of lens 5. In this regard, a field position of lens 5 comprises a position along a substantially horizontal diameter of lens 5. FIG. 9 shows a close-up, face-on view of lens 5 having horizontal diameter 175 and five field positions, namely 176, 177, 178, 179 and 180. In the example shown in FIG. 9, field position 178 is located "on-axis", i.e., at the center of lens 5, field positions 176 and 180 are located ±full field, and field positions 177 and 179 are located ±0.75 field. While this is the preferred layout for the field positions, other layouts, of course, can be used with the present invention.

Of course, other factors also contribute to the MTF values determined by the present invention. For example, different MTF values will be obtained for lenses having different resolutions. As noted above, the lens testing system of the present invention is able to test lenses having different resolutions. Which type of lens is to be tested is input into "Resolution" box 149 of dialog box 129. As noted above, the present lens testing system is preferably capable of testing lenses having resolutions of 2500 dpi and 840 dpi. Other embodiments of the invention can be used to test lenses having different and/or additional resolution values.

Another factor which affects the MTF value is the line pair frequency, e.g., 35 lp/mm, being tested. That is, the lens testing system of the present invention determines different MTF values for different line pair frequencies. To this end, dialog box 129 includes "MTF location" box 136, which specifies the frequency at which the MTF values are to be obtained. In this regard, unlike conventional lens testing systems, the present invention does not require the use of line or "bar" patterns having different frequencies in order to test the resolution of the lens at different frequencies. Rather, the present invention is able to determine MTF values for all frequencies by extracting the MTF values from the edge response of the lens based on collected data sampled by detector 105. Dialog box 129 provides "Pixel spacing" box 131, which stores data used to change the frequency scale. "Number of bits/pixel" box 137 is also provided to store the amount of information (i.e., the number of bits) provided for each pixel.

Turning to the detailed flow diagram of the MTF testing process shown in FIG. 8, step S801 comprises orienting lens 5 in lens holder 103 and storing the orientation thereof. As noted above, lens 5 may be placed in lens holder 103 at different orientations. In preferred embodiments of the invention, lens 5 is oriented and re-oriented manually. Of course, circuitry and mechanics may be included in embodiments the present invention to automate lens orientation and re-orientation in response to commands from lens testing routine 27. In any event, the number of orientations at which lens 5 is tested is input in "Number of orientations" box 140 in dialog box 129. This number is preferably set before testing begins; although it can be reset during testing, if desired.

Next, step S802 comprises moving detector 105 to a particular focus position. Prior to actually moving detector 105, step S802 determines an initial (or "best") focus position for lens 5, at which the resolution of target pattern 101 on detector 105 is at a predetermined level. To do this, lens testing routine 27 moves detector driving mechanism 99 relative to target pattern 101 so as to detect edges of target pattern 101, and so as to focus on appropriate edges of target pattern 101 at different field positions of lens 5. Thereafter, lens testing routine 27 determines the point at which images of target pattern 101 on detector 105 are the sharpest. This is determined by processing the edge response signal data or by manually reviewing an analog trace of the detector edge response on an oscilloscope or the like to select the initial focus position as the position which corresponds to the fastest signal rise time. Pseudo-code for determining the initial focus position is provided in the Appendix below.

After the initial focus position has been determined, detector driving mechanism 99, in response to commands from lens testing routine 27, moves detector 105 relative to lens 5 so that lens 5 focuses light onto detector 105 at a plurality of discrete focus positions. Step S802 moves detector 105 relative to the initial focus position in predetermined increments. In preferred embodiments of the invention, detector 105 is moved to 21 different focus positions at 0.05 mm increments over a 1 mm range. The number of these focus positions and the increment size, however, may be changed. To this end, dialog box 129 includes "Number focus positions" box 132 and "Focus increment" box 134, by which a user may change the number of focus positions and the focus increments, respectively. The speed and acceleration of the actuator in detector driving mechanism 99 may likewise be altered by changing respective values in "Actuator speed" box 160 and "Actuator accel." box 161.

Following step S802, processing proceeds to step S803, in which lens testing routine 27 selects a field position of the lens under test. As noted above, a field position of lens 5 comprises a position along a substantially horizontal diameter of lens 5. In preferred embodiments of the invention, a lens is tested using five field positions, the locations of which are specified in "Field Pos. 1" box 142, "Field Pos. 2" box 143, "Field Pos. 3" box 145, "Field Pos. 4" box 146, and "Field Pos. 5" box 147. These locations correspond to particular ones of features 110 on target pattern 101. Although there are five field position boxes shown in dialog box 129, all of these field positions need not be used in the testing process. That is, three field positions may be used, two may be used, or even only one may be used. How many field positions are used is set in "Number field positions" box 141. Specific field positions are set by the invention which correspond to values input into box 141. Moreover, the invention can be configured to include more than five field positions boxes, and thus to provide MTF measurements at more than five field positions.

Next, processing proceeds to step S804. Step S804 selects a color component of the light provided by light source 100. This step is performed via detector 105 which, as noted above, includes light filters, e.g., red, green, and blue filters (not shown), on different areas thereof. These filters enable pixels on detector 105 to select different components (i.e., wavelengths/colors) of the light transmitted through target pattern 101. The detector 105 may provide a separate analog electrical signal for each of a plurality of colors detected and specifically provides a separate signal for a red, green and blue channel of the detector. Data which is generated based on this light is then read by the lens testing routine.

Following step S804, processing proceeds to step S805. Step S805 determines line spread function data for features of target pattern 101 (in particular, vertical edges of the features 110) imaged onto the CCD of detector 105. Specifically, as noted above, one or more digital signal corresponding to images on the CCD is transmitted to PC 4. Step S805 comprises sampling points, preferably 128 points, across a portion of the digital signal which corresponds to a vertical edge of a feature 110 at the field position set in step S804. In this regard, the approximate vertical edge positions of features 110 of target pattern 101 are input to lens testing routine 27 before testing begins, thereby simplifying edge detection and, thus, the overall sampling process.

The number of sampling points described above can be set by a user in "Number FFT points" box 130. Sampling is then performed, for an edge, in order to measure a transition of an image of the target pattern on the CCD (e.g., the transition between "white" values corresponding to features through which light has passed and "black" values corresponding to other areas of the target pattern through which light has not substantially passed). In this regard, in general, the more sudden that the transition is across the edge, the higher the resolution of the image. To reduce data fluctuations due to noise or the like, the image data may be averaged following this sampling.

Figure 10:
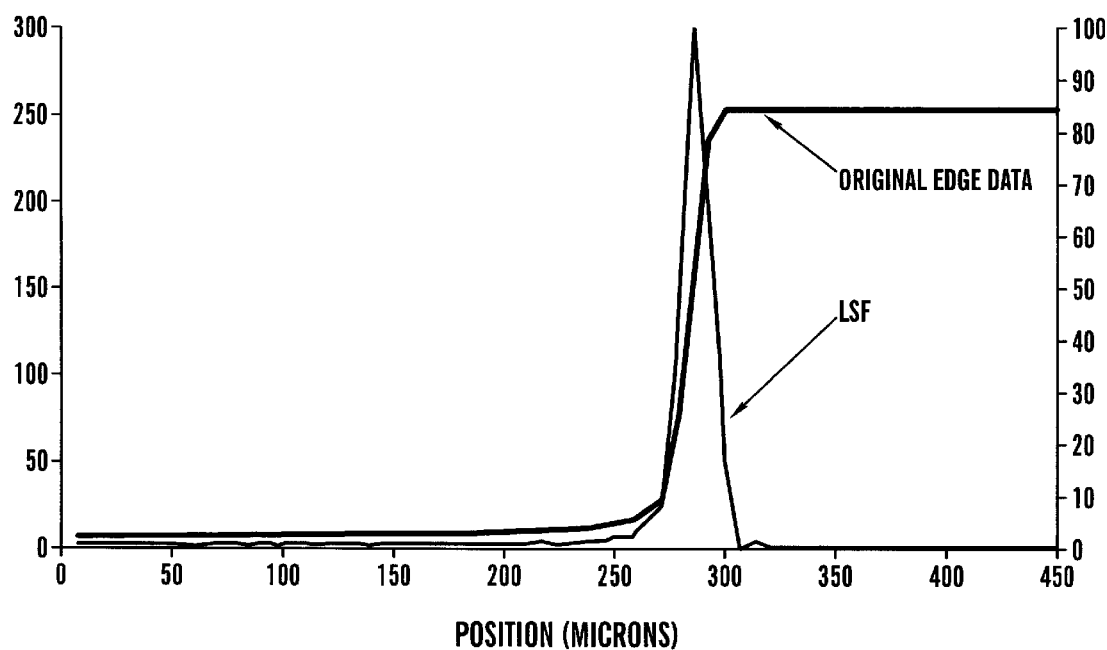
FIG. 10 is a graph showing sampled edge data and line spread function data generated therefrom.

Once data across an edge has been sampled, line spread function data for the edge is generated by differentiating the sampled data. "Derivative threshold" boxes 139 set values for the sampled data below which are considered noise. Accordingly, data falling below these values is disregarded. The line spread function data is then filtered to reduce errors even further. Examples of sampled edge data and line spread function ("LSF") data therefor are shown in the graph of FIG. 10.

Next, step S806 determines through-frequency MTF data for the field position of step S804, the light color component of step S803, the focus position of step S802, and the lens orientation of step S801. To do this, step S806 performs a fast Fourier transform ("FFT") on the line spread function data, thereby obtaining the MTF of the lens at each of the conditions set in steps S801 to S804. In preferred embodiments of the invention, MTF data is obtained for 5 field positions, 3 color/wavelength lights, 21 focus positions, and lens orientation, thereby providing 315 readings per lens (i.e., 3×5×21×1). Of course, these numbers can be varied by changing parameters in dialog box 129, including by adding different lens orientations to the process.

Once MTF data has been determined in step S806, one or more corrections may be performed on the MTF data in order to correct for things such as the limited number of pixels available on the detector and noise present in the data. Column averaging of the edge data (i.e., averaging several samples of the same edge data) may be used to alleviate some of these problems. In addition, the MTF data determined in step S806 may also need to be corrected to take into account the MTF of the detector, i.e., the "detector footprint".

In this regard, step S807 comprises correcting the MTF data for the lens to take into account the MTF of detector 105. This correction to the MTF data is optional, however, and may be selected in lens testing routine 27 by placing a check in "Detect footprint" box 150 shown in dialog box 129. For the detector used in preferred embodiments of the invention, the MTF is a "sinc" function. Specifically, the MTF value, $MTF_j$, of detector 105 is determined as follows:

$$MTF_j = \left| \frac{\sin(\pi f_j Pixelsize)}{\pi f_j Pixelsize} \right|,$$

where $f_j$ comprises a frequency of interest (e.g., 35 lp/nim) and "Pixelsize" comprises a size of pixels on the CCD of detector 105. As noted above, in preferred embodiments of the invention "Pixelsize" is 7 µm. Thus, once the MTF of detector 105 has been determined (either beforehand or in step S807), step S807 corrects the MTF data obtained in step S806 by dividing out the MTF of detector 105.

Step S808 performs corrections on the MTF data obtained in step S806 in order to account for the wavelength (i.e., color) of the light selected in step S803 above. That is, longer wavelength light is not absorbed as well at a pixel site. Thus, such light does not necessarily convert into an electron, but rather may spill over into neighboring pixels, thereby degrading spatial purity. To address this problem, the MTF data obtained in step S806 may be divided by a correction factor corresponding to a color of the light from step S803. At a frequency of 35 lp/nin, and for a representative CCD, these correction factors are: for red light −0.77; for green light −0.87; and for blue light −0.90. These correction factors are shown in "RED" box 151, "GREEN" box 152, "BLUE" box 154, and may be changed as desired depending upon a variety of factors including the frequency of interest. In preferred embodiments of the invention, however, lens testing routine 27 sets these factors automatically based on an input to "MTF location" box 136.

Following step S808, processing proceeds to step S809, in which an MTF value corresponding to a frequency of interest, in this case 35 lp/mm, is extracted from the through-frequency MTF data generated in step S806 and subsequently corrected. Next, in step S810, a sampling correction factor is applied to the MTF value extracted in step S809 so as to correct for alignment of the various sampling sites, i.e., to account for the position at which lens 5 receives light from target pattern 101. Sampling correction is also performed in accordance with a sinc function like that shown above, i.e., $$MTF_j = \left| \frac{\sin(\pi f_j Pixelsize)}{\pi f_j Pixelsize} \right|.$$

For a frequency of 35 lp/nmu, and for the geometry of the preferred embodiment of the invention shown in FIG. 1, the sampling correction factor calculates to 0.90 and is wavelength independent. As was the case above, the corrected MTF value is divided by the sampling correction factor. The sampling correction factor may be changed by changing a value in "Sampling" boxes 164 of dialog box 129. In preferred embodiments of the invention, lens testing routine 27 sets this sampling factor automatically.

Following step S810, processing proceeds to step S811. Step S811 determines whether there are any colors/wavelengths of light remaining to be tested for lens 5. In a case that there are colors remaining to be tested, processing returns to step S804, whereafter steps S804 to S810 are repeated for the remaining colors. In a case that there are no colors/wavelengths remaining, processing proceeds to step S812. Step S812 determines whether the testing process has been performed for all field positions of lens 5. In a case that there are field positions at which the lens has not been tested, processing returns to step S803, whereafter steps S803 to S811 are repeated for the remaining field positions. In a case that there are no field positions remaining, processing proceeds to step S813. Step S813 determines whether there are any focus positions remaining to be tested for lens 5. In a case that there are focus positions remaining, processing returns to step S802, whereafter steps S802 to S812 are repeated for the remaining focus positions. In a case that there are no focus positions remaining, processing proceeds to step S814. Step S814 determines whether there are any orientations of lens 5 for which the foregoing testing process is to be performed. In a case that there are lens orientations remaining, processing returns to step S801, whereafter steps S801 to S813 are repeated for the remaining lens orientations. In a case that there are no lens orientations remaining, processing proceeds to step S815.

Figure 11:
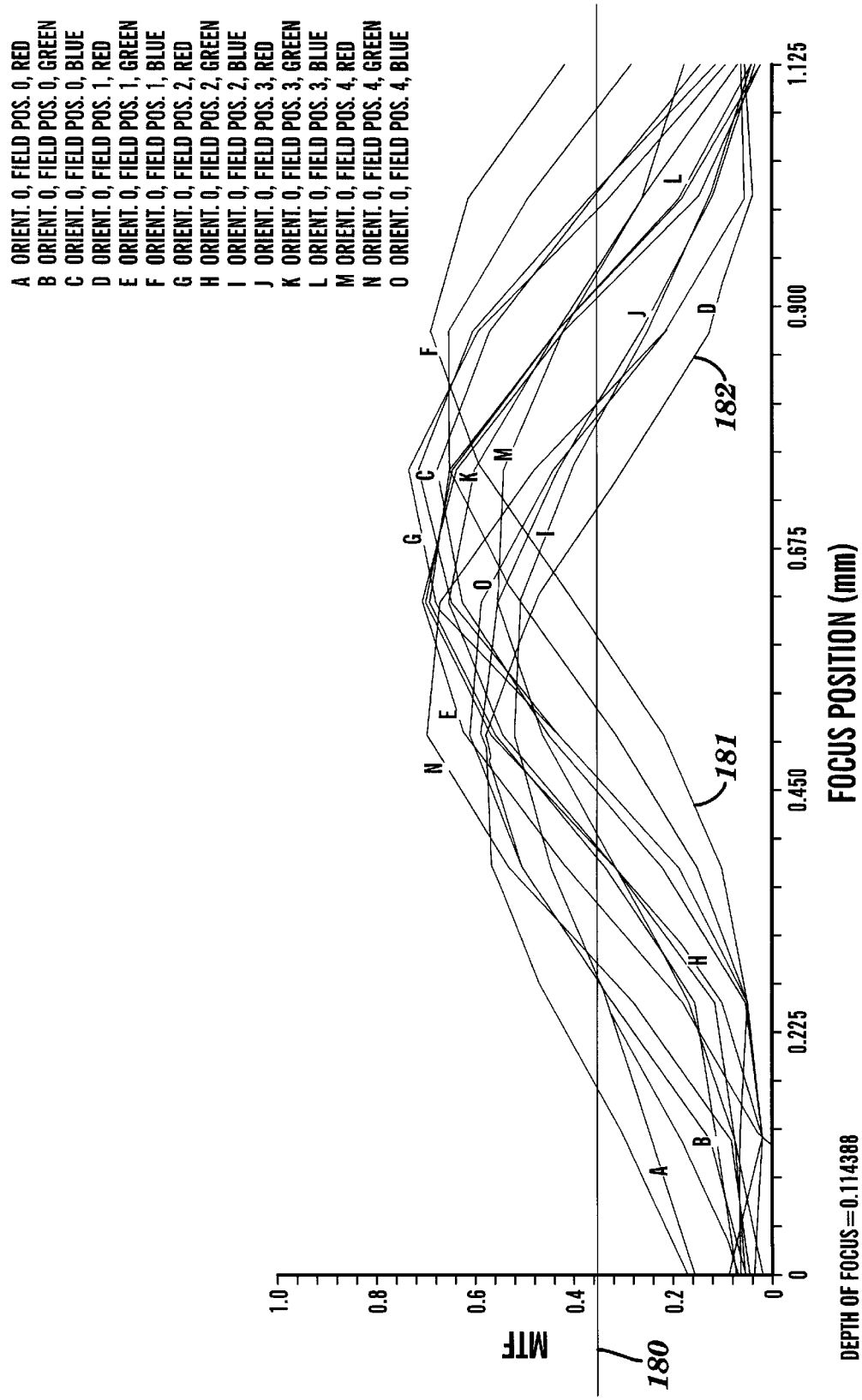
FIG. 11 is a graph showing various lens MTF curves plotted against focus position.

Step S815 determines whether a depth-of-focus is to be determined for lens 5. In this regard, a depth-of-focus of lens 5 can be determined based on the MTF values obtained in steps S801 to S814, in the manner described below. Thus, in a case that a depth-of-focus is to be determined for lens 5, processing proceeds to step S816. Step S816 graphs MTF values for different lens orientations, field positions, and light colors/wavelengths in terms of focus position. An example of such a graph is shown in FIG. 11. Thus, as shown in FIG. 11, the MTF values for the different focus positions define a plurality of curves, each curve defining a modulation transfer function of lens 5 in terms of focus position for a particular lens orientation, a particular field position, and a particular light color. The depth-of-focus of lens 5 is based on at least one of the curves shown in FIG. 11.

More specifically, for a particular frequency, step S817 determines the depth-of-focus for lens 5 based on the difference between one or two of the curves shown in FIG. 11. That is, the depth-of-focus of lens 5 is based on the difference between the inner-most rising and falling curves at a particular MTF value. Thus, for the example shown in FIG. 11, step S817 determines the depth-of-focus of lens 5 at MTF value 180 by taking the difference between curve 181 at MTF value 180 and curve 182 at MTF value 180. The MTF at which the depth-of-focus is to be determined may be set in "MTF for focus depth" box 156. A minimum focus depth resulting in a successful lens test may be set in "Minimum focus depth" box 157.

In addition, in preferred embodiments of the invention, the information obtained above may be used to determine the focal length of lens 5. In these embodiments, dialog box 129 may also include a box for inputting a minimum focal length resulting in a successful lens test, together with any additional parameters that may be needed to determine the lens' focal length. This process is described in detail below.

Following step S817, processing returns to step S703 of FIG. 7. Step S703 of FIG. 7 determines whether to perform a color registration error test on lens 5. This test is performed for each of the three components of the light from light source 100, i.e., for red, green and blue light. In general, the color registration error test is performed by comparing locations on detector 105, specifically on the CCD, of features of target pattern 101 which have been illuminated with the three components of light from light source 100. More specifically, in a case that step S703 determines that a color registration error test is to be performed, step S704 comprises comparing the same edge position imaged onto the detector's CCD in each of the three colors of light. Thus, assuming that a position for green light is the nominal position, the color registration errors for blue light (the nominal primary color) and for red light (the nominal secondary color) are determined as follows:

Primary Color Error=(Green Pixel Position−Blue Pixel Position)(7 μm/pixel)

Secondary Color Error=(Green Pixel Position−Red Pixel Position)(7 μm/pixel).

Figure 12:
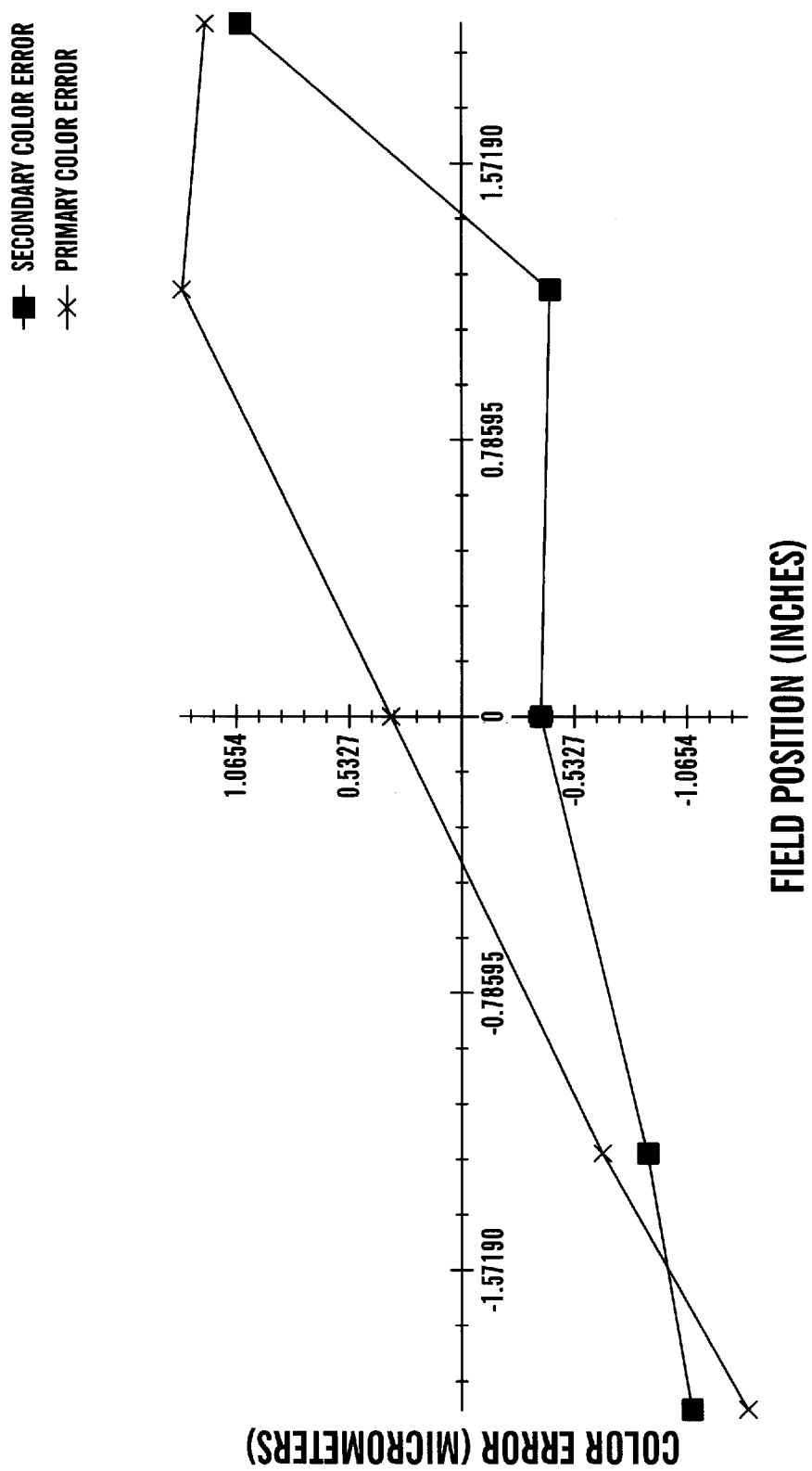
FIG. 12 is a graph showing lens color registration errors for primary and secondary light colors.

A maximum color error resulting in a successful lens test may be input in "Maximum color error" box 159 in dialog box 129. FIG. 12 shows plots of typical primary and secondary color errors. In FIG. 12, the center of the vertical axis corresponds to field positions along lens 5, and the horizontal axis corresponds to the lateral color error.

In a case that step S703 determines not to perform a color registration error test on lens 5, or following a color registration test, processing proceeds to step S705. Step S705 determines whether to perform a distortion test on lens 5. Distortion refers to variations in magnification across a field of lens 5. In a case that step S705 decides not to perform a distortion test on lens 5, processing proceeds to step S707. On the other hand, in the case that step S705 decides to perform a distortion test on lens 5, processing proceeds to step S706, in which the distortion test is performed.

Figure 13:
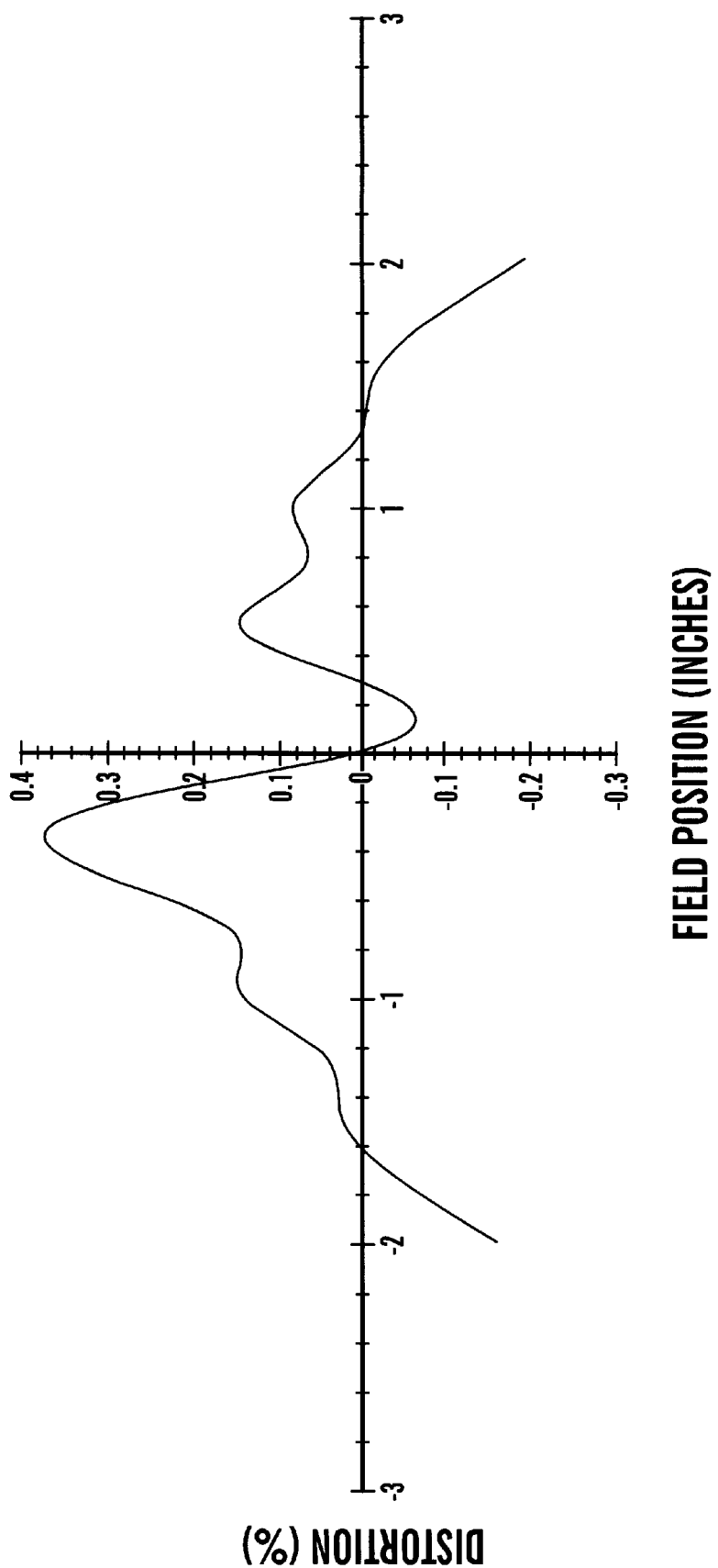
FIG. 13 is a graph depicting amounts of lens distortion.

Distortion of a lens can be measured using only one color channel, i.e., either the red, green, or blue component of the light from light source 100. This is because lateral color requirements force distortion of each color light to be closely matched. In order to determine distortion, 50% transition points across feature edges corresponding to lens field positions are determined. Thereafter, magnification is measured (i.e., calculated) at each position relative to an edge of a feature located near the center of target pattern 101. Lens distortion is then calculated for a particular area of lens 5, as follows:

$$\text{Magnification} = \frac{\text{Number of Pixels} \cdot 7\ \mu m}{\text{Actual Size}\ \mu m}$$

$$= \%\ \text{Distortion} = \frac{\text{Magnification} - \text{Nominal Magnif.}}{\text{Nominal Manif.}} \cdot 100\%$$

where the nominal magnification corresponds to the magnification near the "on-axis" field position (i.e., at 0.25 inches from the center of target pattern 101) and 7 μm comprises the size of pixels in detector 105. FIG. 13 shows a graph for a lens having positive distortion. In the graph shown in FIG. 13, the center of the vertical axis corresponds to field positions along lens 5, and the horizontal axis corresponds to percentages of distortion of lens 5 relative to the field positions. A maximum distortion value resulting in a successful test of lens 5 may be input in "Maximum distortion" box 158 of dialog box 129.

In a case that step S705 determines not to perform a lens distortion test on lens 5, or following a lens distortion test, processing proceeds to step S707. Step S707 determines whether to calculate the focal length of lens 5. In a case that step S707 determines not to calculate the focal length of lens 5, the processing of FIG. 7 ends. On the other hand, in a case that step S707 determines that focal length is to be calculated, processing proceeds to step S708.

In this regard, in the context of the present invention, the lens focal length determined in step S708 is more of a measure of focal length variation between a group of lenses. The initial parameter used to determine focal length is the lens' first principal plane distance, denoted "P1". P1 can be determined based on the lens' design data or, alternatively, P1 can be determined empirically from the lens itself. The focal length is also determined based on the resolution of the lens (in dpi), which is effectively equivalent to the lens' magnification ("M"). More specifically, using some first order optics, the lens' focal length, denoted "f", is determined as follows, where "P2" comprises the lens' second principal plane distance:

$$f = \frac{\frac{P1 \cdot P2}{M} - P1}{P1 + P2}, \text{ where}$$

Rearranging the variables in equation (2) to define P2 in terms of M and P1, and substituting the resultant into equation (1) yields $$f = \frac{P1 \cdot (P1 \cdot M)}{P1 + P1 \cdot M},$$

which reduces, in final form, to $$f = \frac{P1 \cdot M}{1 + M}.$$

Accordingly, step S708 determines the focal length of lens 5 based on P1 and M. As noted, P1 can be determined empirically or from pre-specified design data, and M is measured in the manner noted above. After determination of lens focal length in step S708, processing ends.

Following the processing shown FIG. 7, flow returns to step S609 of FIG. 6. Step S609 outputs lens test results. As described above, these test results may be output to display screen 11, e.g., via dialog box 190 shown in FIG. 14. In this regard, dialog box 190 includes measured values for depth-of-focus, focal length, distortion, and lateral color (i.e., color error), together with specified values 191 which correspond to a successful lens test. Indications of whether the lens under test meets these specified values are also provided under "Status" column 192. The test results shown in dialog box 190 may also be output on an attached peripheral device, such as printer 19, or transmitted to a remote source via network connection 9 and/or fax/modem connection 10.

Once the test results are output, lens 5 is removed in step S610 and flow proceeds to step S611. Step S611 determines whether another lens is to be tested using the lens testing system of the present invention. In the case that another lens is to be tested, flow returns to step S602. In step S602, a new lens is installed in testing apparatus 2 and an identification number, e.g., a serial number, therefor is input to lens testing routine 27. Thereafter, the new lens is tested in the manner described above. In this regard, except for manual positioning of the lens, in preferred embodiments of the invention, the foregoing testing process takes less than (or roughly equal to) five minutes. Returning to step S611, in the case that step S611 determines that another lens is not to be tested, the lens testing process ends.

The present invention has been described with respect to a particular illustrative embodiment. It is to be understood that the invention is not limited to the above-described embodiment and modifications thereto, and that various changes and modifications may be made by those of ordinary skill in the art without departing from the spirit and scope of the appended claims.

---

APPENDIX

The following pseudo-code comprises one way in which to find an initial or "best" focus position. Other ways, of course, may be used in the practice of the present invention.

```
Scan area for edge
Find Edge and save width as "nwidth".
(We will call the routine that scans an area, finds an edge and returns
the width
"getwidth( )" routine.)
width = nwidth * Initialize variables. "width" to hold current
smallest width
*/
while (nwidth <= width)
{
    ++focus
    nwidth = get width( )
    if (nwidth <= width)
        width = nwidth
    * width holds smallest width found so far */
}
/* nwidth must be increasing if drop out of loop */
focus--    * Move to last "best" position */
focus--    * Move one step further */
nwidth = getwidth( )
if (nwidth <= width)
    width = nwidth
while (nwidth <= width)
{
    focus--
    nwidth = getwidth( )
    if (nwidth <= width)
        width = nwidth
}
/* When fall out of here, have just moved through rough best focus;
Continue to move in this direction until nwidth = 1.3*width */
```

-continued

APPENDIX

```
Save current focus position as "foc0"
while (nwidth <1.3*width)
{
    focus--
    nwidth = getwidth( )
}
Save position as "foc1"
/* This position has a width 30% bigger than minimum width found */
Move to foc0 position
while (nwidth <1.3*width)
/* Now go in other direction to find symmetrical 1.3*width position */
{
    focus ++
    nwidth = getwidth( )
}
Save focus position as "foc2"
Best focus position = Average(foc1, foc2)
```

What is claimed is:

1. A system for determining one or more properties of a lens, the system comprising:
   a light source;
   a target pattern comprising a stationary edge illuminated by the light source and substantially positioned at a first conjugate position of the lens;
   a detector, including an active surface, said active surface being substantially positioned at a second conjugate position of the lens such that an image of the target pattern is formed by the lens onto the active surface, said detector providing an analog electrical signal in response to the image being formed thereon;
   a device for receiving an analog electrical signal from the detector and for converting the analog electrical signal to a digital signal;
   a memory which stores processor-executable process steps; and
   a processor which executes the process steps stored in the memory so as to process the digital signal to obtain a through-frequency modulation transfer function value of the lens.

2. A system according to claim 1, wherein the processor executes the process steps stored in the memory so as also to obtain at least one of, a focal length of the lens, a distortion of the lens, and a color registration error of the lens, based on processing the digital signal.

3. A system according to claim 1, wherein the processor executes process steps stored in the memory so as to perform one or more corrections on the modulation transfer function value of the lens.

4. A system according to claim 3, wherein the one or more corrections include corrections to take into account a modulation transfer function value of the detector.

5. A system according to claim 4, wherein the detector comprises a charge coupled device ("CCD") having plural pixels; and
   wherein the modulation transfer function value, $MTF_j$, of the CCD is determined as follows:

$$MTF_j = \left| \frac{\sin(\pi f_j Pixelsize)}{\pi f_j Pixelsize} \right|.$$

where $f_j$ comprises a frequency of interest and "Pixelsize" comprises a size of pixels corresponding to the CCD.

6. A system according to claim 1, wherein the processor obtains the modulation transfer function value of the lens by executing process steps which generate a line spread function for the stationary edge and which perform a Fourier transform on the line spread function.

7. A system according to claim 6,
   wherein the processor generates the line spread function by differentiating a portion of the digital signal corresponding to the stationary edge.

8. The apparatus according to claim 1 wherein the detector comprises a linear CCD comprising a single row of pixel elements.

9. A method for determining a through-frequency modulation transfer function of a lens, comprising the steps of:
   illuminating a target pattern comprising a stationary edge positioned at a first conjugate position of the lens with light from a light source such that an image of the stationary edge is formed at a second conjugate position of the lens;
   positioning an active surface of a detector substantially at the second conjugate position of the lens such that the detector provides an analog electrical signal in response to light from the image of the edge falling onto the active surface;
   converting the analog signal to a digital signal, said digital signal comprising a plurality of data points corresponding to the detector response;
   sampling at least some of the plurality of data points corresponding to the image of the edge;
   differentiating the sampled data points corresponding to the edge to determine a line spread function of the sampled data points;
   performing a Fourier transform on sampled data points corresponding to the line spread function, said Fourier transform providing a modulation transform value for all frequency values.

10. The method according to claim 9 further comprising the step of; reducing signal noise by filtering the sampled data points after the step of differentiating.

11. The method according to claim 9 further comprising the step of; making one or more corrections to the modulation transform value for all frequency values, said one or more corrections including one of, a correction for taking into account a size of each pixel of the detector; and, a correction for taking into account a wavelength of the target illumination.

12. A system for determining one or more properties of a lens, the system comprising:
   a light source;
   a target pattern illuminated by the light source and substantially positioned at a first conjugate position of the lens;
   a detector, including an active surface, said active surface being substantially positioned at a second conjugate position of the lens such that an image of the target pattern is formed by the lens onto the active surface, said detector providing an analog electrical signal in response to the image being formed thereon;
   a device for receiving an analog electrical signal from the detector and for converting the analog electrical signal to a digital signal;
   a memory which stores processor-executable process steps; and
   a processor which executes the process steps stored in the memory so as to process the digital signal to obtain a modulation transfer function value of the lens the system further comprising:

a detector driving mechanism on which the detector is mounted for moving the detector;

wherein the detector is movable substantially along an optical axis of the lens such that the active surface is movable to a plurality of discrete positions with respect to the image formed by the lens; and wherein, for each of the plurality of discrete positions, the processor executes the process steps stored in the memory to obtain a modulation transfer function value of the lens.

13. A system according to claim 12, wherein the light source is capable of providing light comprised of a plurality of different colors and wherein the detector provides a separate electrical signal in response to each of the plurality of different colors; and wherein, for each of the plurality of discrete positions, the processor executes the process steps stored in the memory to obtain a modulation transfer function value of the lens for each of the plurality of different colors.

14. A system according to claim 13, wherein the plurality of colors comprises red, green and blue.

15. A system according to claim 12, wherein the target pattern includes features positioned at distal ends thereof and wherein the features positioned at distal ends correspond with distal ends of the field of view of the lens; and wherein, for each of the discrete positions, the processor executes the process steps stored in the memory so as to obtain a modulation transfer function value of the lens based, at least in part, on an image of the features positioned at distal ends of the target pattern.

16. A system according to claim 15, wherein the lens field of view includes five field positions and wherein the target pattern includes features substantially positioned at each of the five field positions of the lens.

17. A system according to claim 12, further comprising a lens holder which is capable of holding the lens at a plurality of rotational orientations about the optical axis;

wherein, for each of the discrete positions, the processor executes the process steps stored in the memory so as to obtain a modulation transfer function value of the lens based, at least in part, on the rotational orientation of the lens about the optical axis.

18. A system for determining one or more properties of a lens, the system comprising:

a light source;

a target pattern illuminated by the light source and substantially positioned at a first conjugate position of the lens;

a detector, including an active surface, said active surface being substantially positioned at a second conjugate position of the lens such that an image of the target pattern is formed by the lens onto the active surface, said detector providing an analog electrical signal in response to the image being formed thereon;

a device for receiving an analog electrical signal from the detector and for converting the analog electrical signal to a digital signal;

a memory which stores processor-executable process steps; and a processor which executes the process steps stored in the memory so as to process the digital signal to obtain a modulation transfer function value of the lens wherein the lens includes a plurality of field positions and the light source is capable of providing light comprised of a plurality of different colors, the system further comprising:

a lens holder which is capable of holding the lens at a plurality of orientations about the optical axis; and a detector driving mechanism on which the detector is mounted, the detector driving mechanism moving the detector relative to the image formed by the lens so that the detector is to a plurality of discrete positions; and, wherein, for each of the discrete positions, the processor executes the process steps stored in the memory so as to obtain plural modulation transfer function values of the lens based on an orientation of the lens about the optical axis, a field position of the lens, and a color component of the light.

19. A system according to claim 18, wherein the processor executes the process steps stored in the memory so as also to determine a depth-of-focus for the lens based on modulation transfer function values of the lens for the plurality of discrete positions.

20. A system according to claim 19, wherein the modulation transfer function values for the plurality of discrete positions define a plurality of curves, each curve defining a modulation transfer function of the lens in terms of one of the discrete positions for a particular lens orientation about the optical axis, a particular field position, and a particular light frequency; and wherein the depth-of-focus for the lens is based on at least one of the plurality of curves.

21. A system according to claim 20, wherein, for a particular modulation transfer frequency, the depth-of-focus for the lens is determined based on the difference between two points on at least one of the plurality of curves.

22. A method of determining one or more properties of a lens, the method comprising the steps of:

illuminating a target pattern comprising a stationary edge positioned at a first conjugate position of the lens with light from a light source such that an image of the test target pattern if formed at a second conjugate position of the lens;

positioning an active surface of a detector substantially at the second conjugate position of the lens such that the detector provides an analog electrical signal in response to the image falling onto the active surface;

converting the analog signal to a digital signal; and obtaining a through-frequency modulation transfer function value of the lens based on the digital signal.

23. A method according to claim 22, further comprising the step of performing one or more corrections on the modulation transfer function value of the lens.

24. A method according to claim 23, wherein the one or more corrections include corrections to take into account a modulation transfer function value of the detector.

25. A method according to claim 24, wherein the detector comprises a charge coupled device ("CCD") having plural pixels; and wherein a modulation transfer function value, $MTF_j$, of the detector is determined as follows:

$$MTF_j = \left| \frac{\sin(\pi f_j Pixelsize)}{\pi f_j Pixelsize} \right|.$$

where $f_j$ comprises a frequency of interest and "Pixelsize" comprises a size of pixels corresponding to the CCD.

26. A method according to claim 23, wherein the one or more corrections includes correcting the modulation transfer function value to account for a wavelength of the light used to illuminate the target pattern.

27. A method according to claim 23, further comprising the step of;
moving the detector to a plurality of discrete positions with respect to the image; and
wherein the one or more corrections includes correcting the modulation transfer function value to account for a modulation transfer function value determined at each of the plurality of discrete positions.

28. A method according to claim 27, wherein the light source is capable of providing light comprised of a plurality of different colors and wherein the digital signal comprises a separate digital signal for each of the plurality of colors; and
wherein the one or more corrections includes correcting the modulation transfer function value to account for a modulation transfer function value determined for each of the plurality of different colors.

29. A method according to claim 22, further comprising the steps of:
generating line spread function data for the stationary edge; and
performing a Fourier transform on the line spread function data in order to obtain the through-frequency modulation transfer function value of the lens.

30. A method according to claim 29, wherein the feature of the target pattern comprises an edge; and
wherein the step of generating the line spread function data generates the line spread function data by differentiating a portion of the digital signal corresponding to the edge.

31. A method according to claim 22, wherein the lens includes a plurality of field positions and the target pattern includes a plurality of features substantially positioned to correspond with each of the plurality field positions of the lens; and,
wherein the modulation transfer function value of the lens is based, at least in part, on a modulation transfer function value of each of the plurality of field positions of the lens.

32. A method according to claim 31, wherein the lens includes five field positions.

33. A method according to claim 22, wherein the illuminating, positioning, converting, and obtaining steps are performed in roughly five minutes or less.

34. A method according to claim 22, further comprising the step of moving the lens among a plurality of different orientations about an optical axis of the lens; and
determining the modulation transfer function value of the lens based, at least in part, on an orientation of the lens about the optical axis.

35. A method of determining one or more properties of a lens, the method comprising the steps of:
illuminating a target pattern positioned at a first conjugate position of the lens with light from a light source such that an image of the test target pattern if formed at a second conjugate position of the lens;
positioning an active surface of a detector substantially at the second conjugate position of the lens such that the detector provides an analog electrical signal in response to the image falling onto the active surface;
converting the analog signal to a digital signal; and
obtaining a modulation transfer function value of the lens based on the digital signal further comprising the steps of:
moving the detector to a plurality of discrete positions relative to the image formed by the lens; and
obtaining a modulation transfer function value of the lens for each of the discrete position.

36. A method according to claim 35, wherein the light source is capable of providing light comprised of a plurality of different colors; and
wherein, for each of the discrete positions, the obtaining step obtains a modulation transfer function value of the lens based, at least in part, on a color component of the light.

37. A method according to claim 36, wherein the plurality of colors comprises red, green and blue.

38. A method of determining one or more properties of a lens, the method comprising the steps of:
illuminating a target pattern positioned at a first conjugate position of the lens with light from a light source such that an image of the test target pattern if formed at a second conjugate position of the lens;
positioning an active surface of a detector substantially at the second conjugate position of the lens such that the detector provides an analog electrical signal in response to the image falling onto the active surface;
converting the analog signal to a digital signal; and
obtaining a modulation transfer function value of the lens based on the digital signal wherein the light source is capable of providing light comprised of a plurality of different colors, the method further comprising the steps of:
moving the lens among a plurality of different orientations about the optical axis;
moving the detector to a plurality of discrete positions with respect to the image formed by the lens; and
wherein, for each of the plurality of orientations and for each of the plurality of positions, the obtaining step obtains plural modulation transfer function values of the lens based on the orientation and the position of the lens.

39. A method according to claim 38 wherein the plural modulation transfer values are corrected for, a field position of the lens, and a color component of the light.

40. A method according to claim 38, further comprising the step of obtaining a-depth-of-focus for the lens based on the plural modulation transfer function values.

41. A method according to claim 40, wherein each of the plural modulation transfer function values defines a curve and wherein the obtaining step further comprises selecting a modulation transfer function of the lens based on a comparison of the plurality of curves.

42. A method according to claim 41, wherein, for a particular modulation transfer frequency, the depth-of-focus for the lens is determined based on the difference between two points on at least one of the plurality of curves.

43. A system for determining one or more properties of a lens for one or more component colors, the system comprising:
a light source for emitting radiation with a plurality of color components;
a target pattern illuminated by the light source and substantially positioned at a first conjugate position of the lens;
a detector, including an active surface, said active surface being substantially positioned at a second conjugate position of the lens such that an image of the target pattern is formed by the lens onto the active surface, said detector being configured to separately detect color components of light transmitted from the target pattern and to provide a separate analog electrical signal in response to selected color components of the image of the target pattern being formed thereon;

a device for receiving the analog electrical signal in response to each of the selected color components of the image from the detector and for converting each of the analog electrical signals to digital signals;

a memory which stores processor-executable process steps; and a processor which executes the process steps stored in the memory so as to process each of the digital signal to obtain a modulation transfer function value of the lens for each of the separate color components of the image.

44. The apparatus according to claim 43 wherein the detector comprises a tri-linear CCD comprising three rows of pixel elements and wherein the detector further comprises three light filter disposed one over each row of pixel elements to enable each row of pixel elements to detect a different color component of the light transmitted from the target pattern.

45. A system according to claim 43, wherein the detector is moveable with respect to the image formed by the lens and further wherein the one or more corrections includes correcting the modulation transfer function value of the lens to account for a position of the detector with respect to the image.

46. A system according to claim 43 wherein the processor executes the process steps stored in the memory so as to determine a color registration error value of the lens.

47. A system according to claim 43, wherein the detector is moveable with respect to the image formed by the lens and wherein the one or more corrections includes moving the detector to a plurality of discrete positions, determining the modulation transfer function value of the lens for the red, the green and the blue channel at each of the plurality of discrete positions and determining a color registration error of the lens based thereon.

* * * * *